Figure 17:
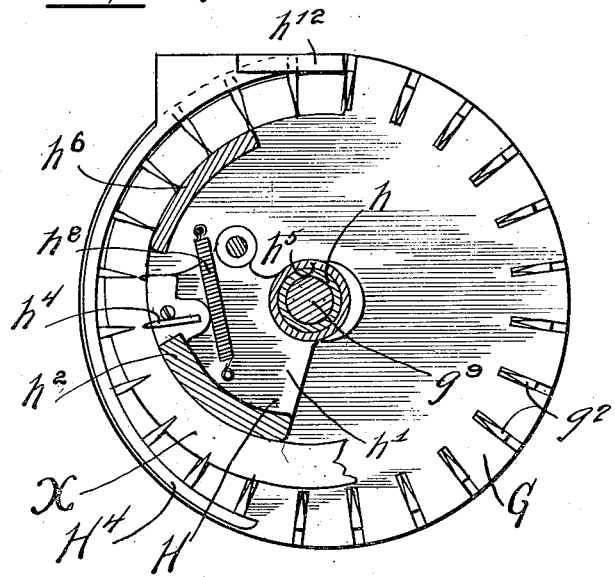

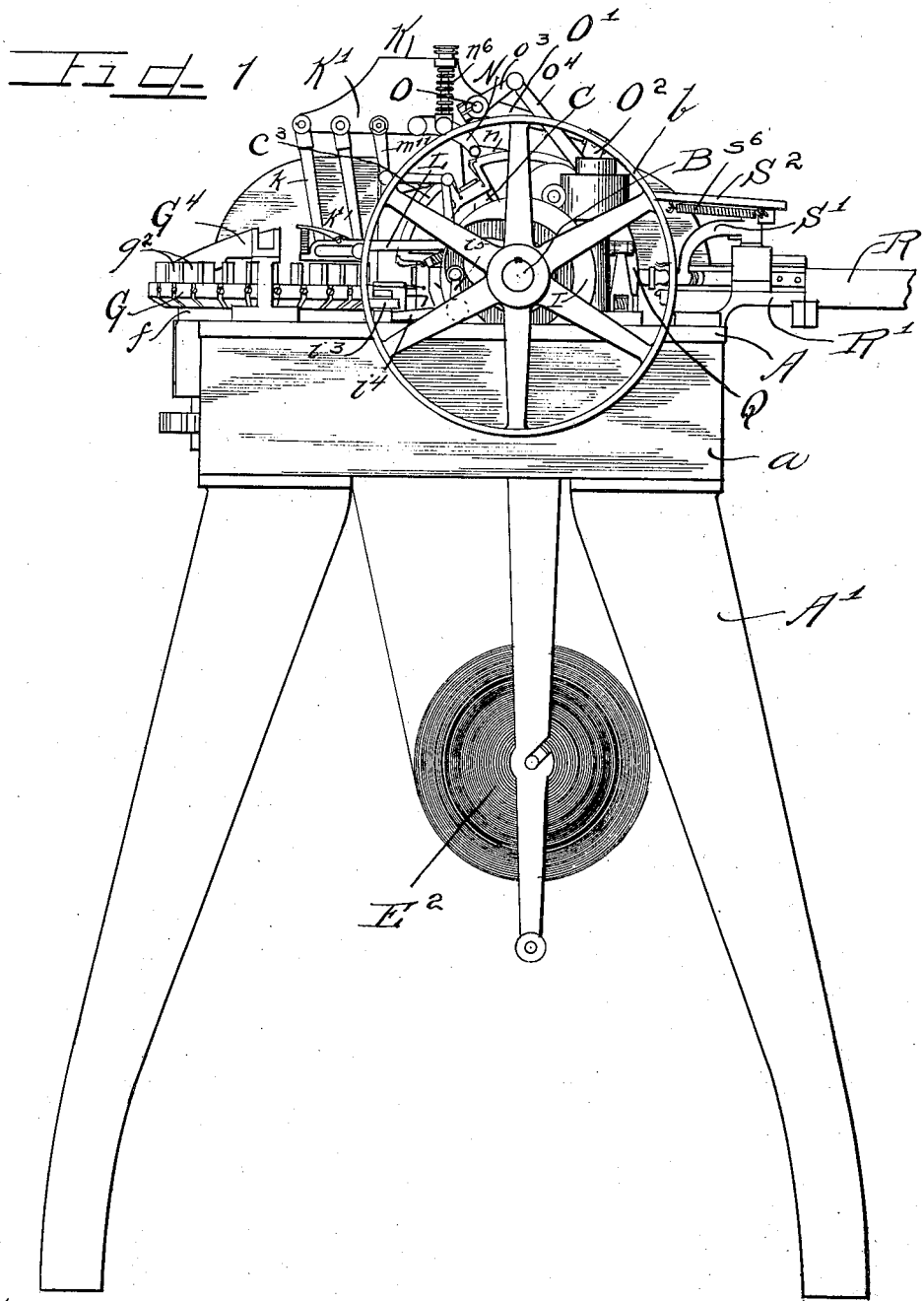

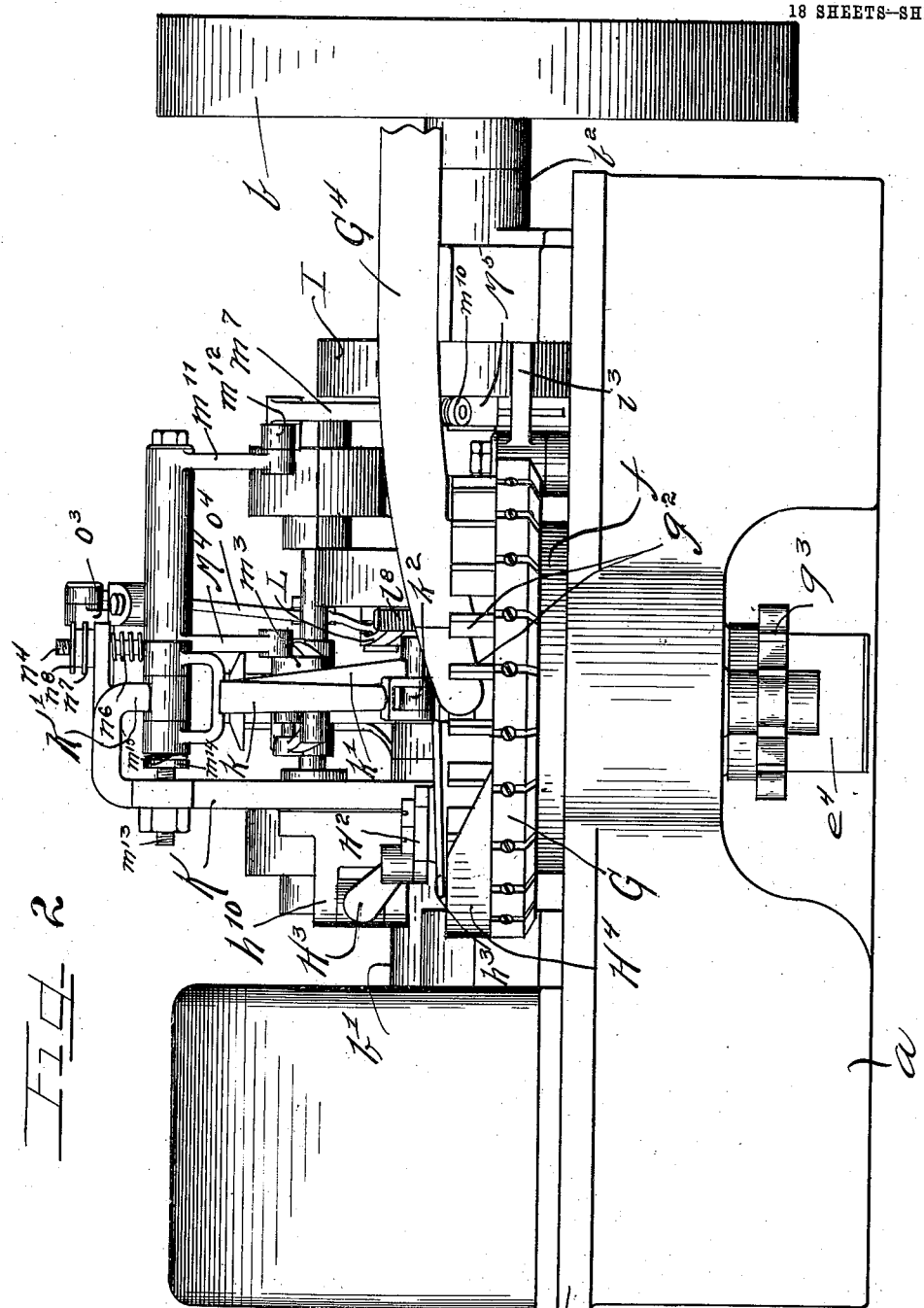

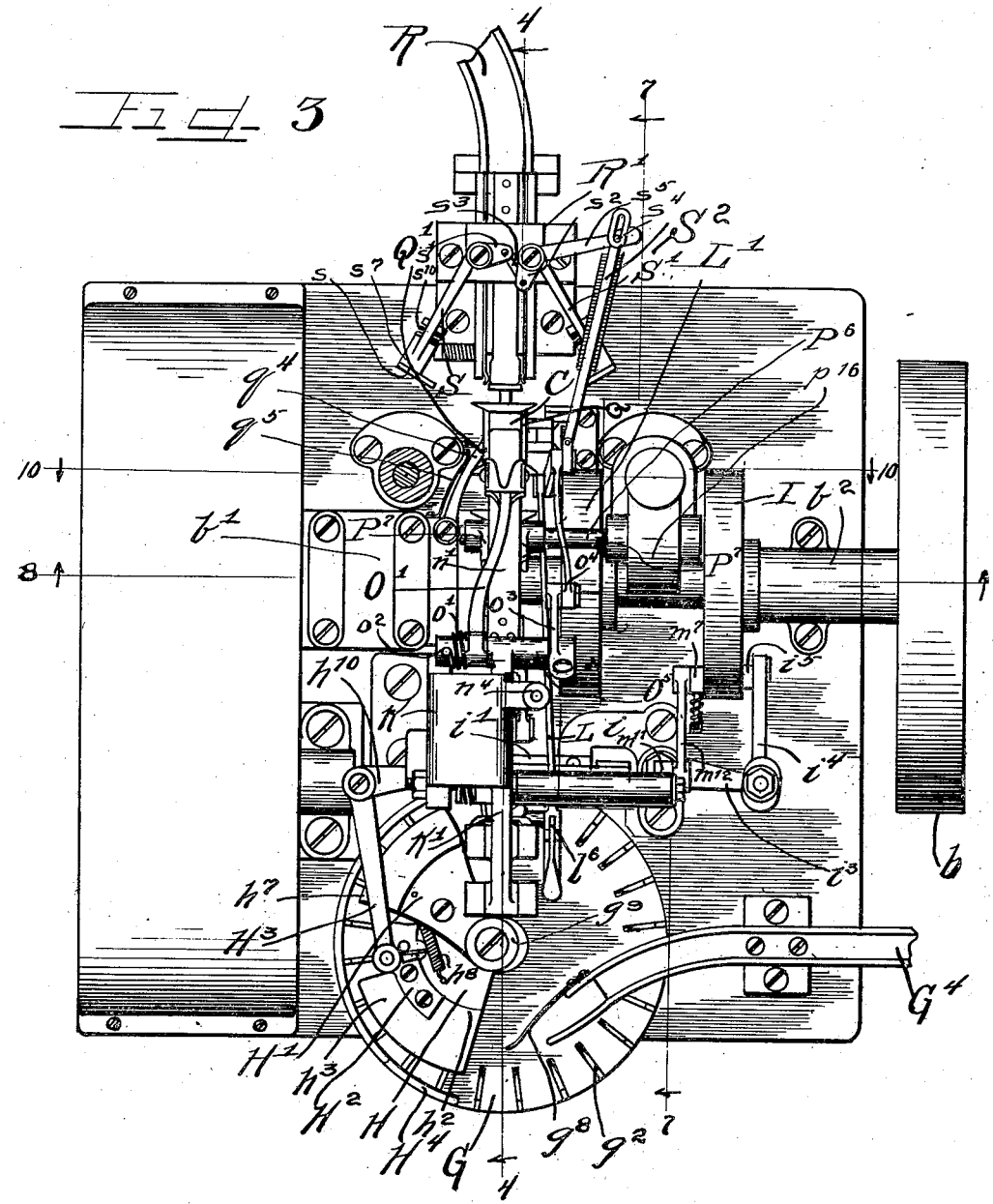

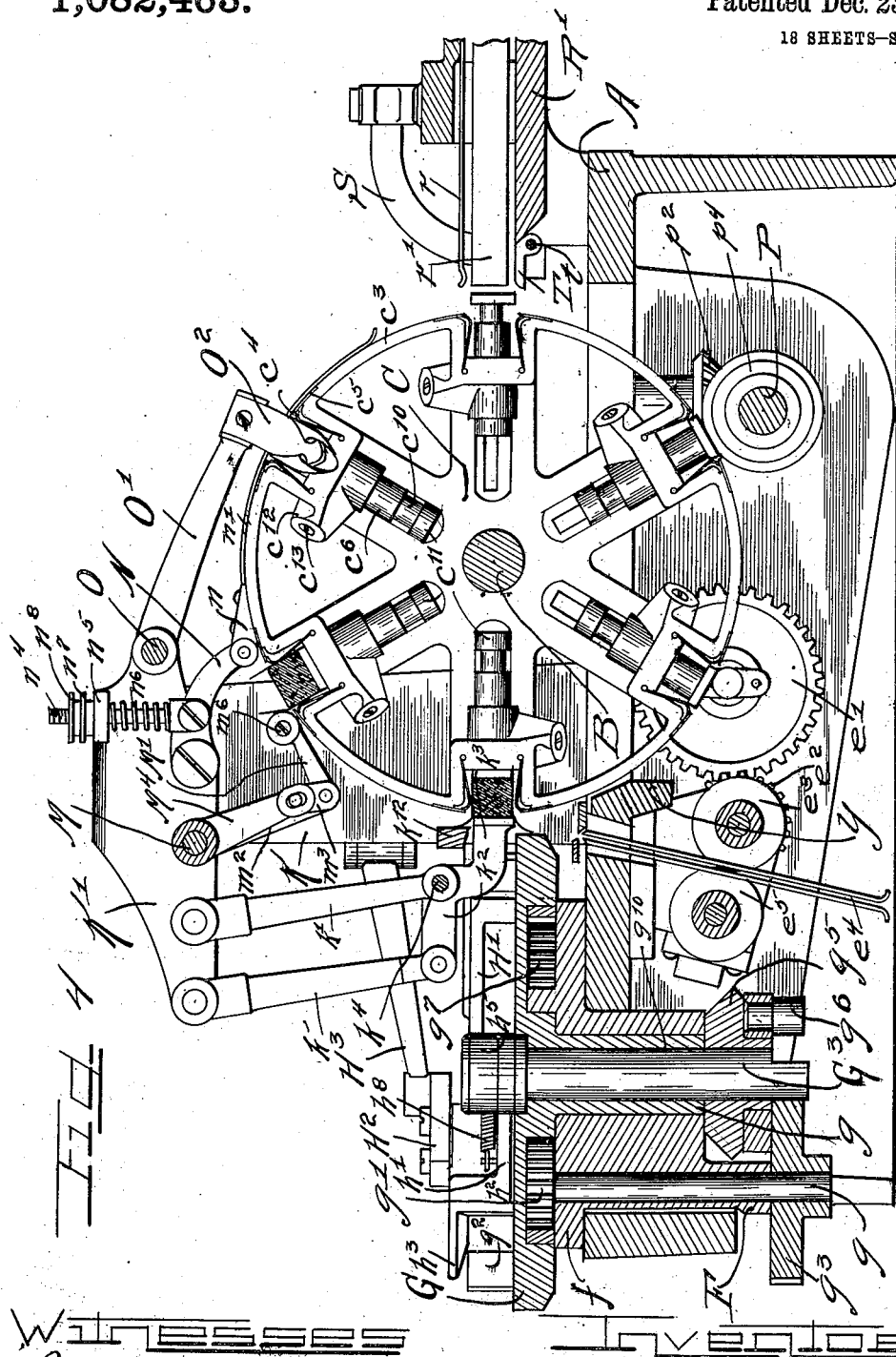

A. E. HOPKINS & O. S. FELLOWS.
WRAPPING MACHINE.
APPLICATION FILED SEPT. 3, 1907.
1,082,463.
Patented Dec. 23, 1913.
18 SHEETS—SHEET 5.
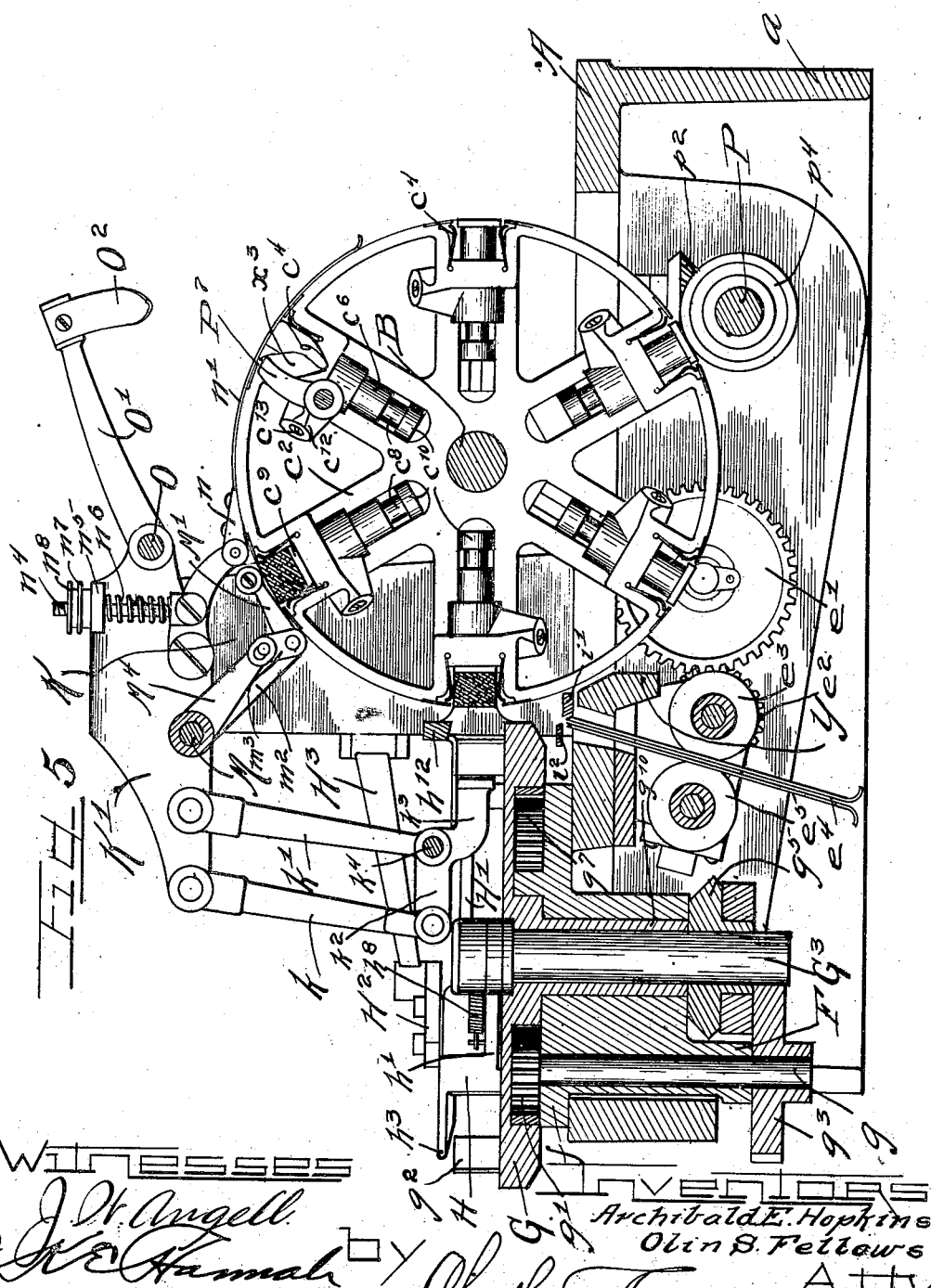

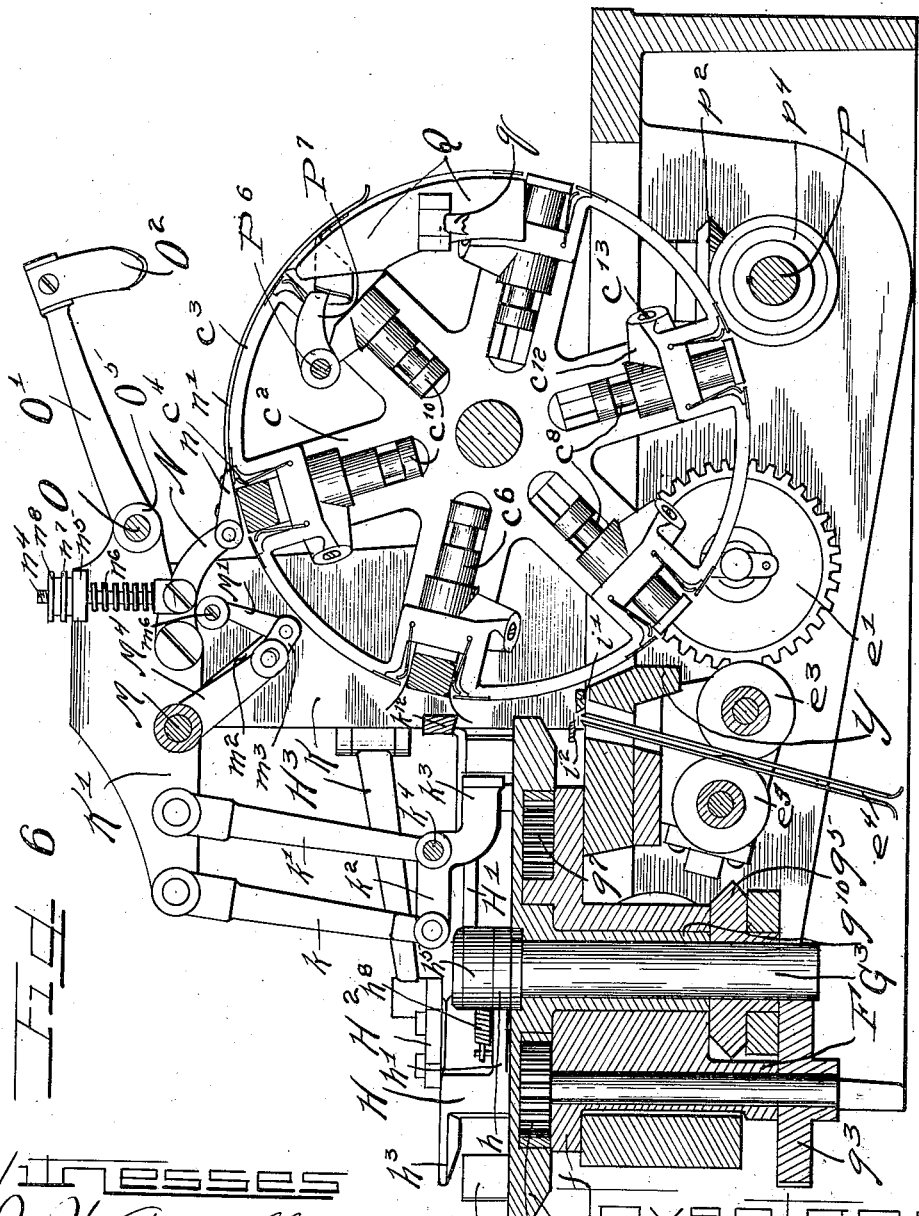

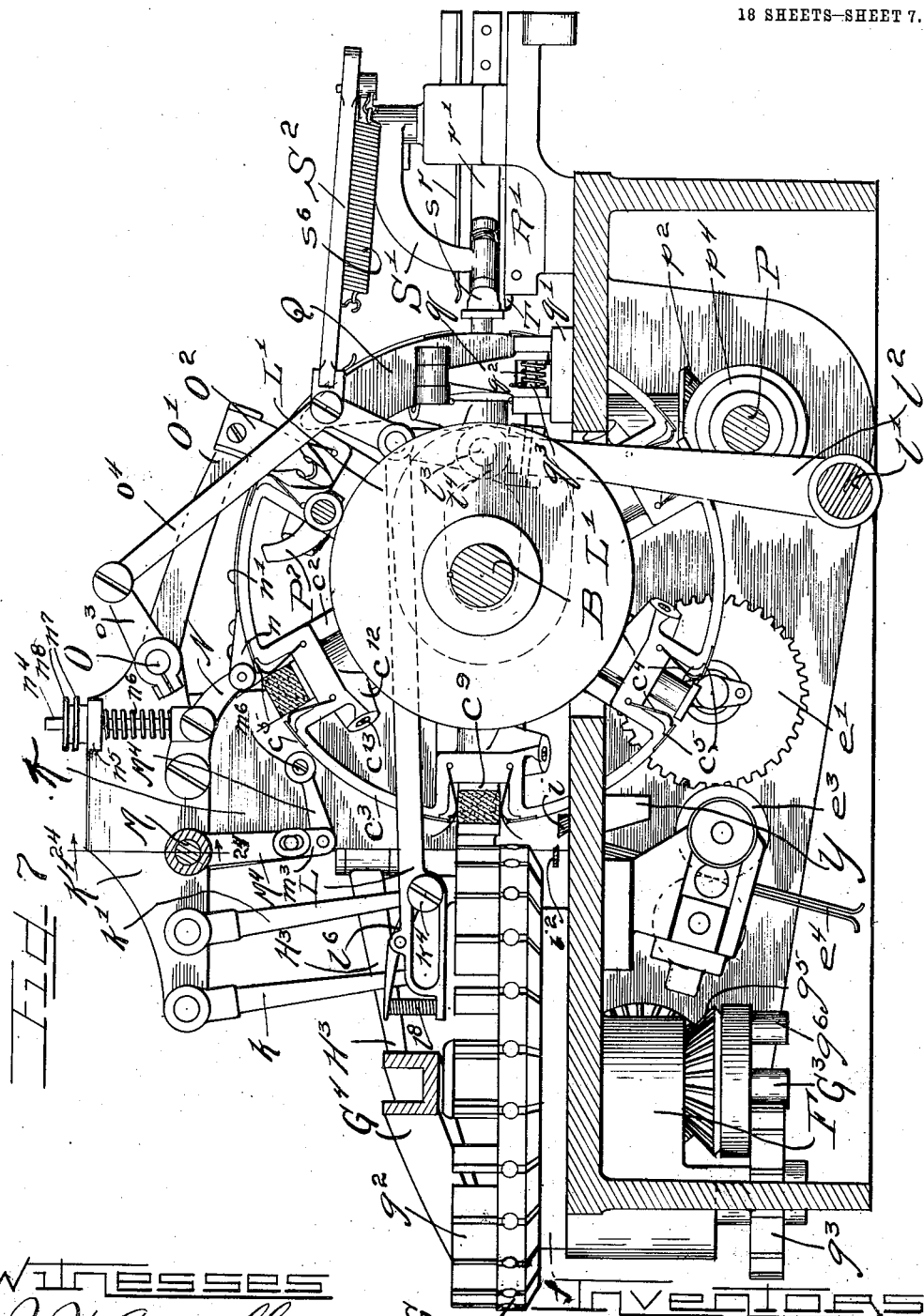

A. E. HOPKINS & O. S. FELLOWS.
WRAPPING MACHINE.
APPLICATION FILED SEPT. 3, 1907.

1,082,463.

Patented Dec. 23, 1913.
18 SHEETS—SHEET 8.

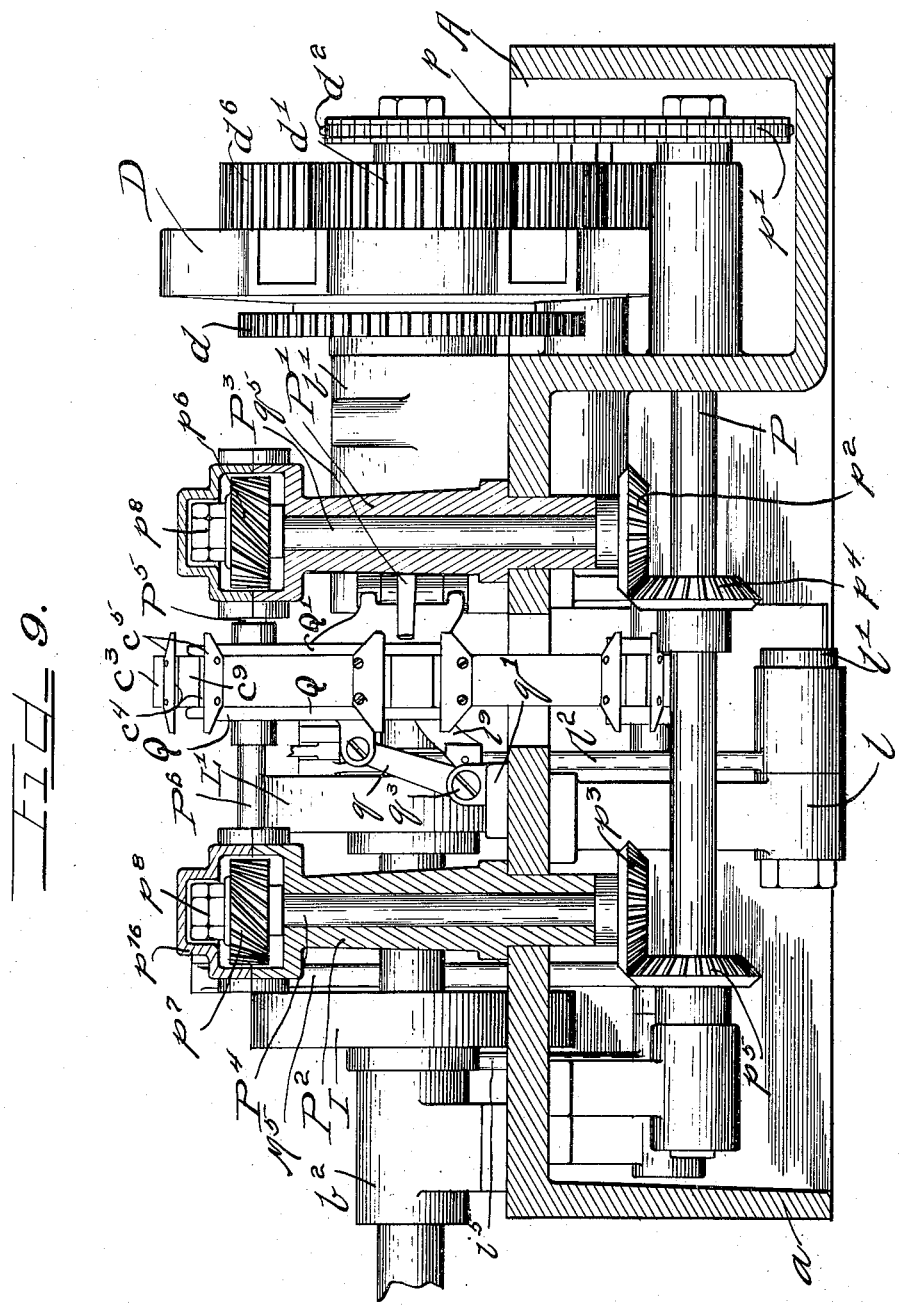

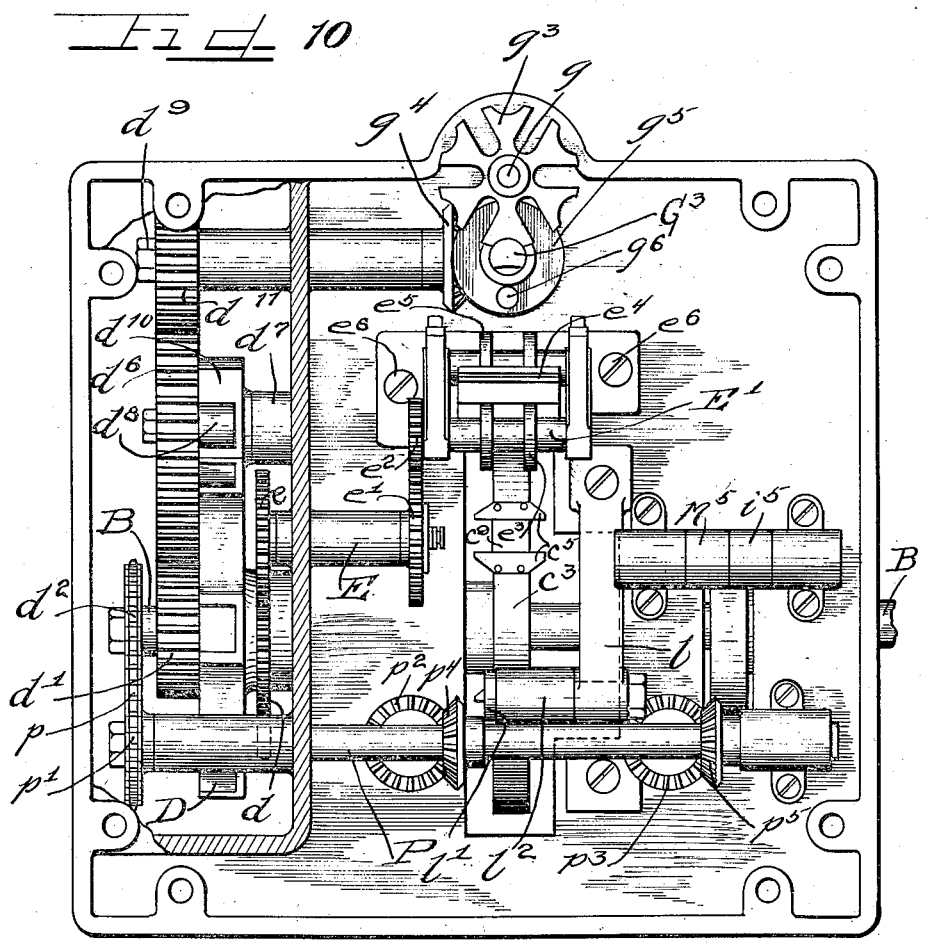

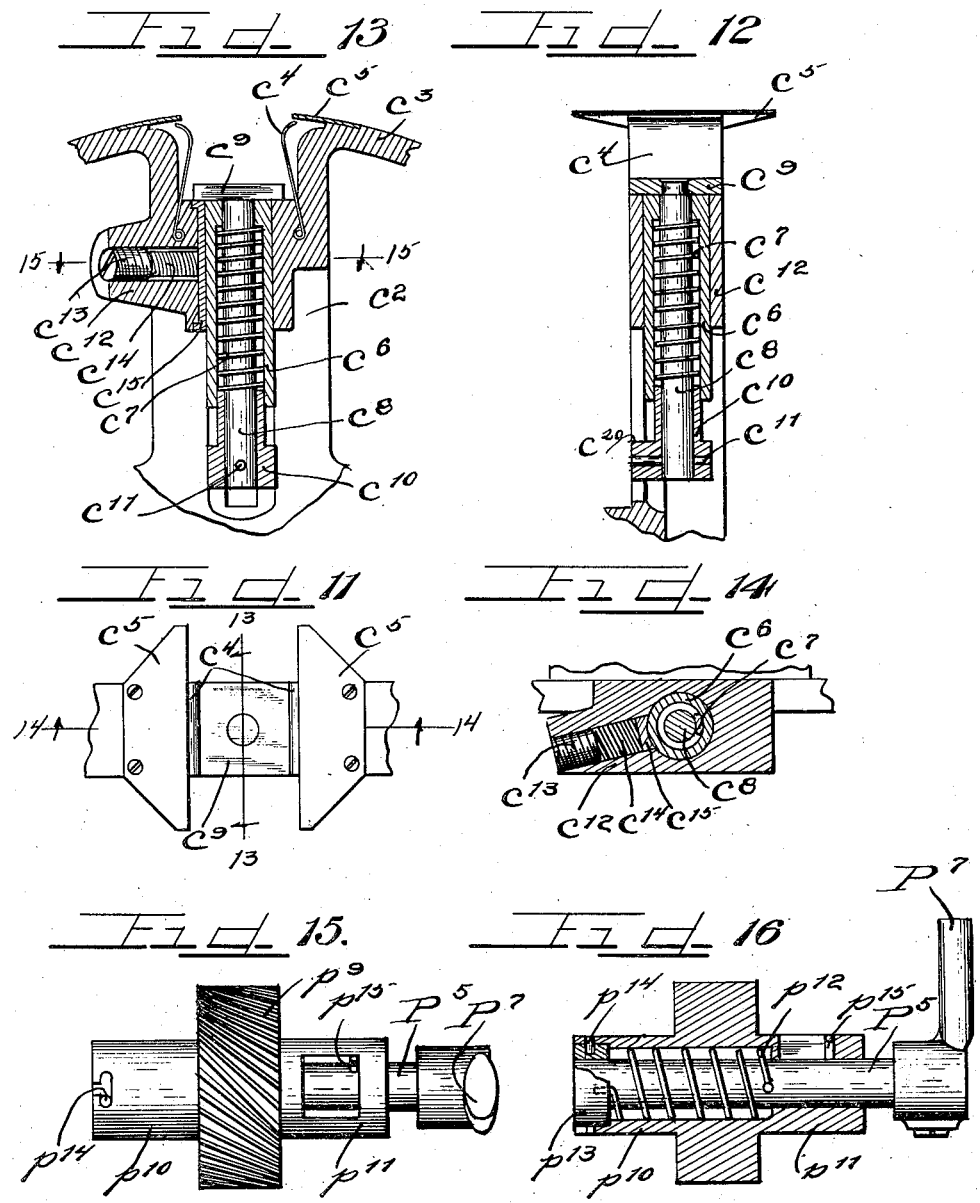

A. E. HOPKINS & O. S. FELLOWS.
WRAPPING MACHINE.
APPLICATION FILED SEPT. 3, 1907.

1,082,463.

Patented Dec. 23, 1913.
18 SHEETS—SHEET 12.

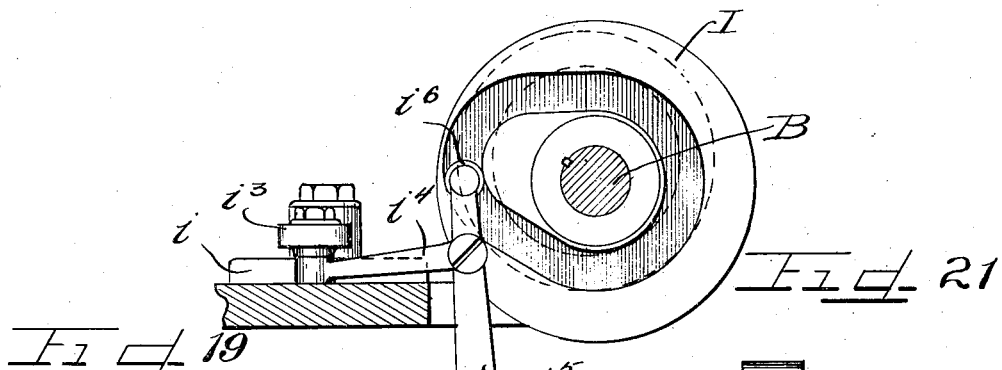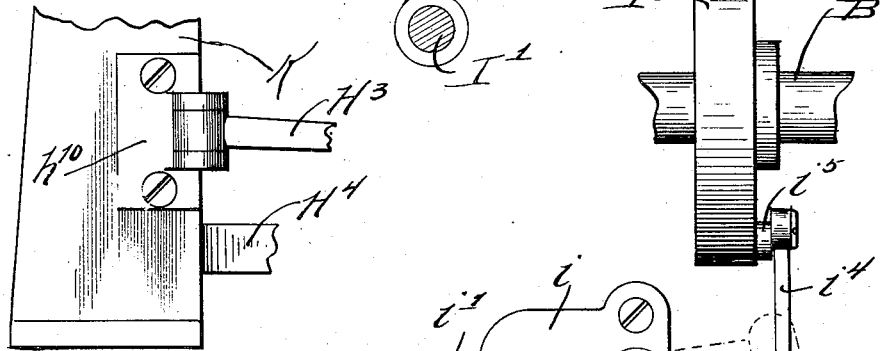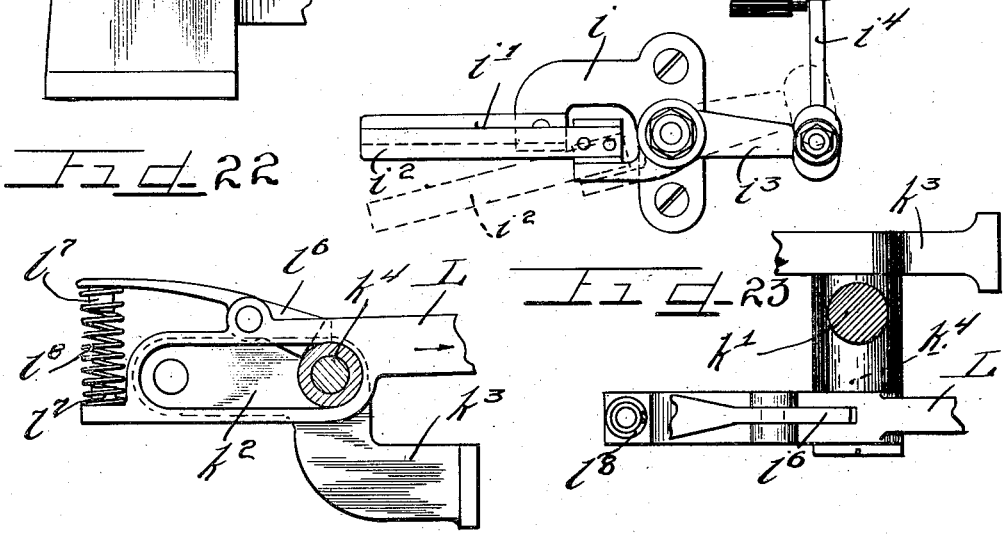

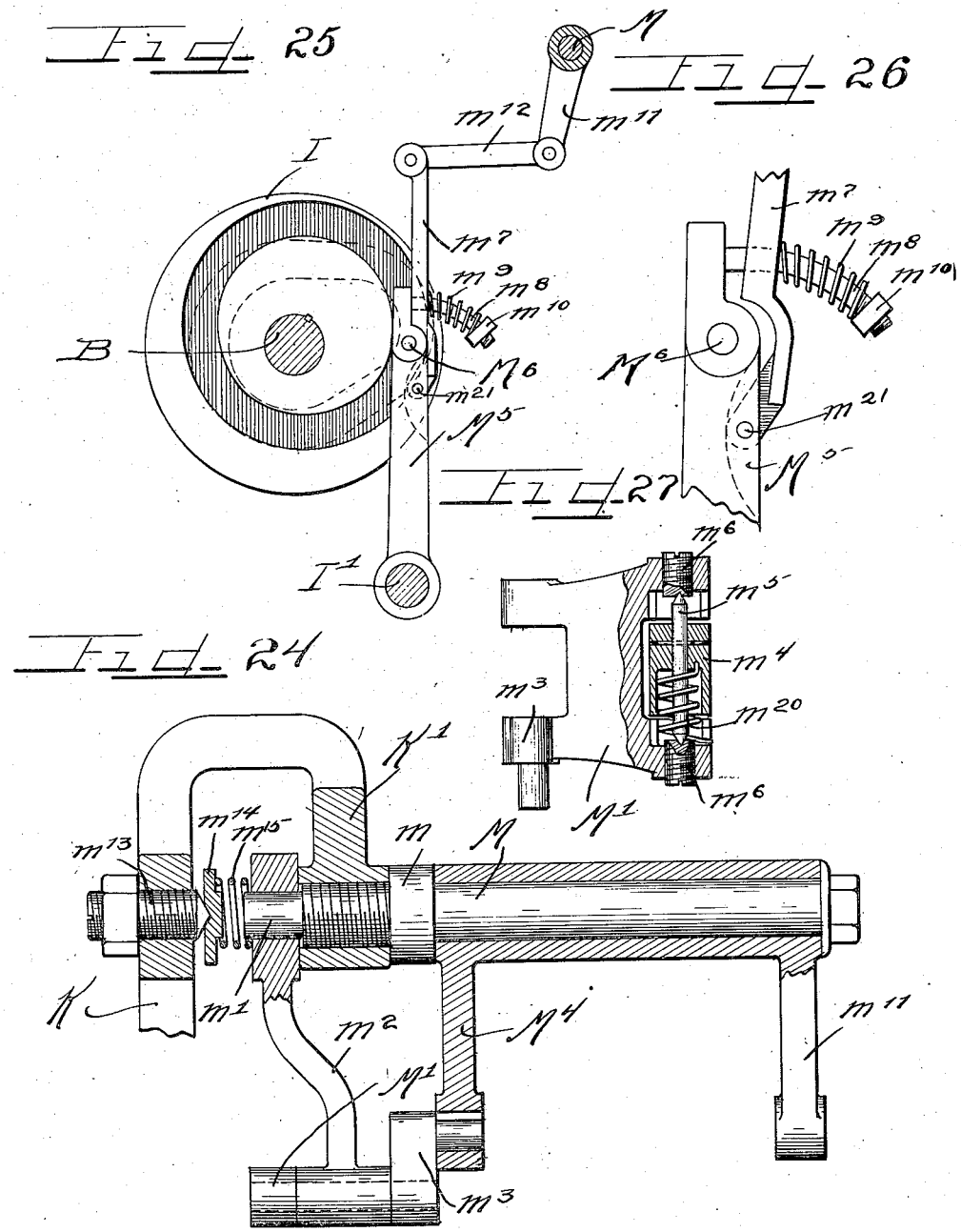

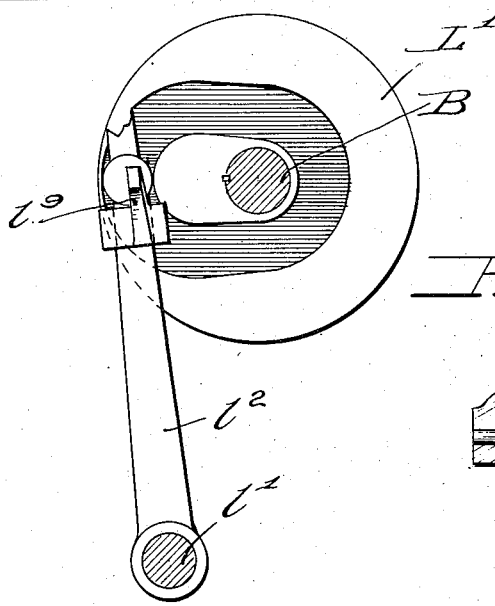
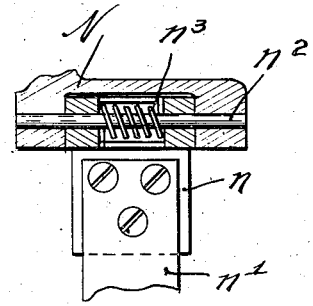
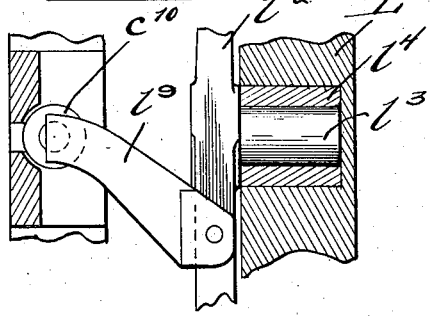
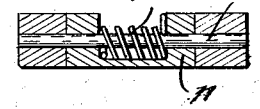
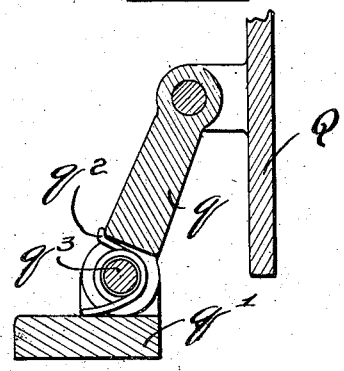

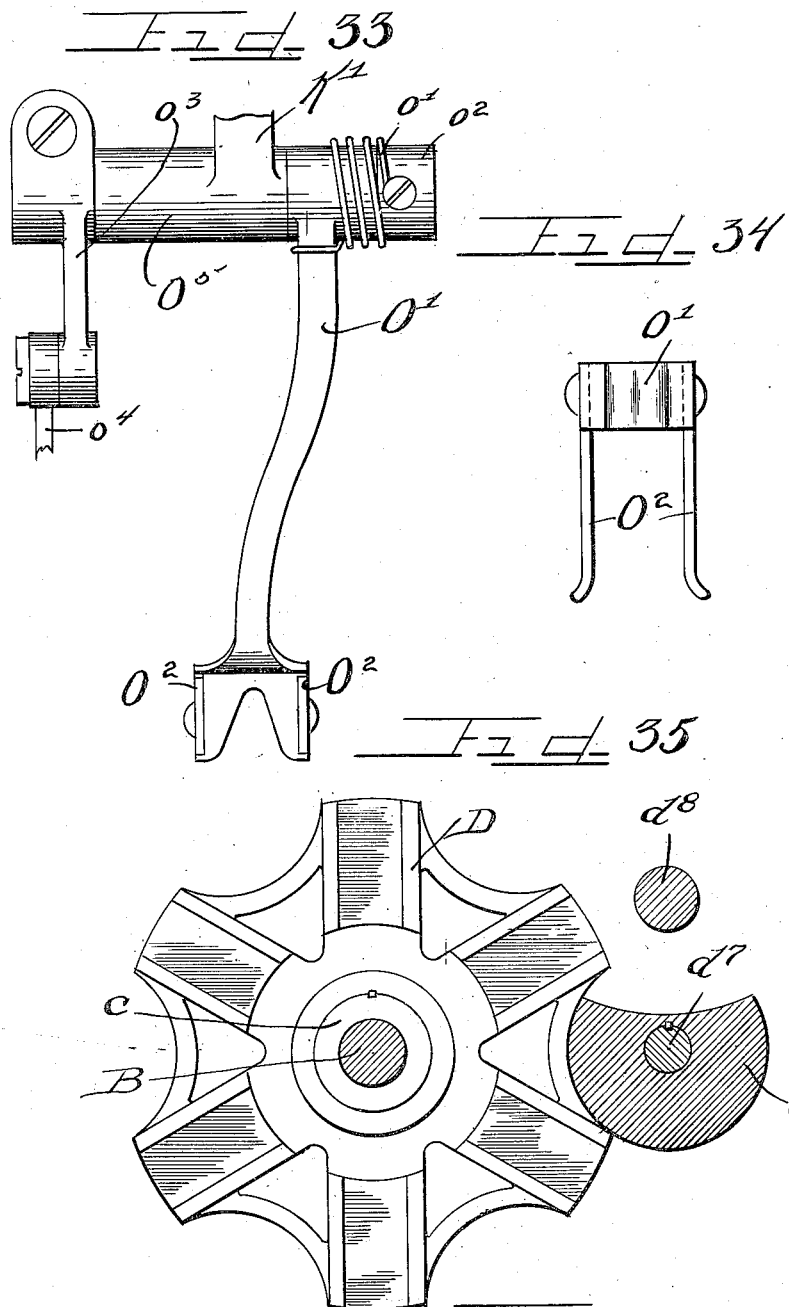

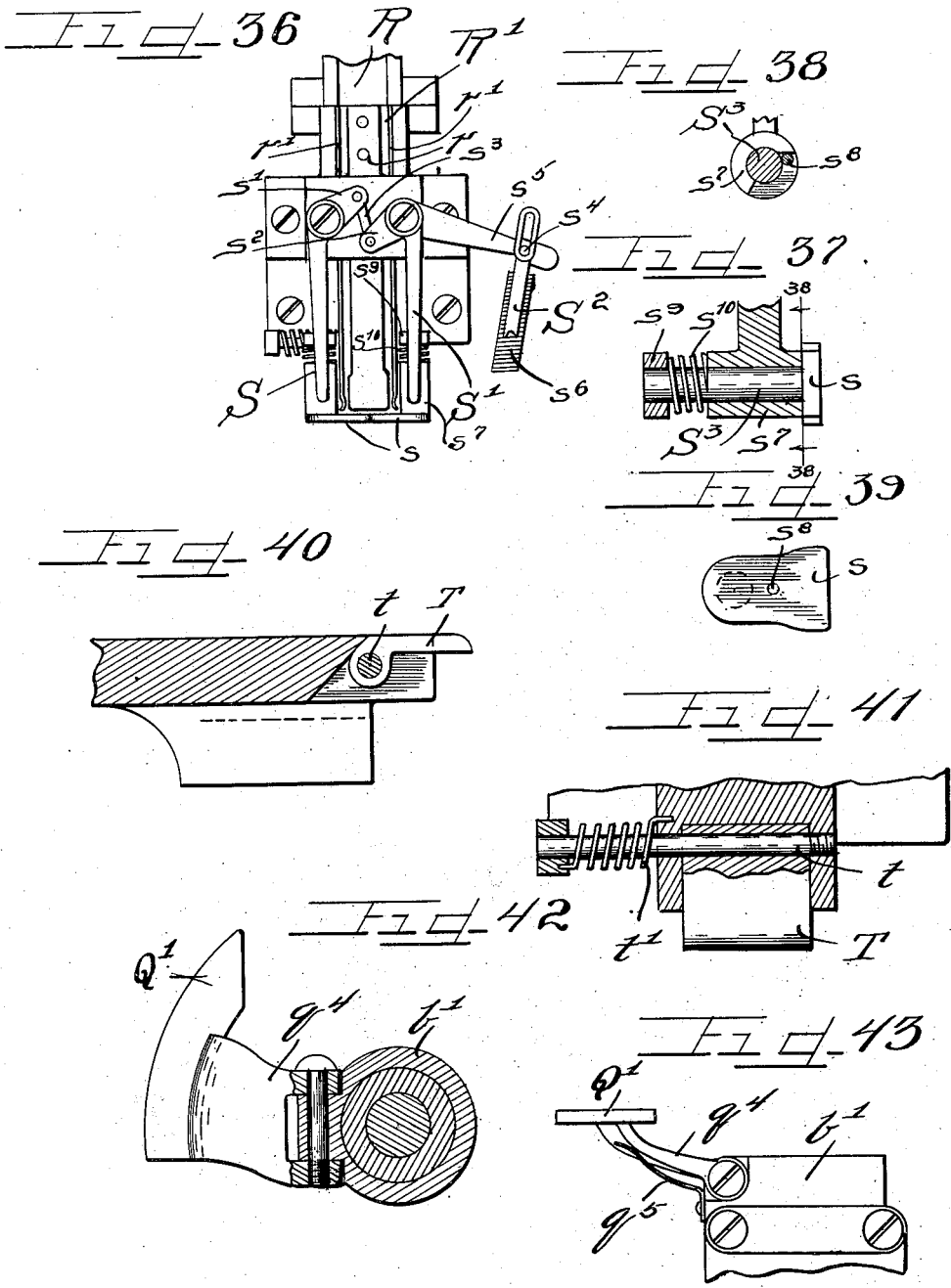

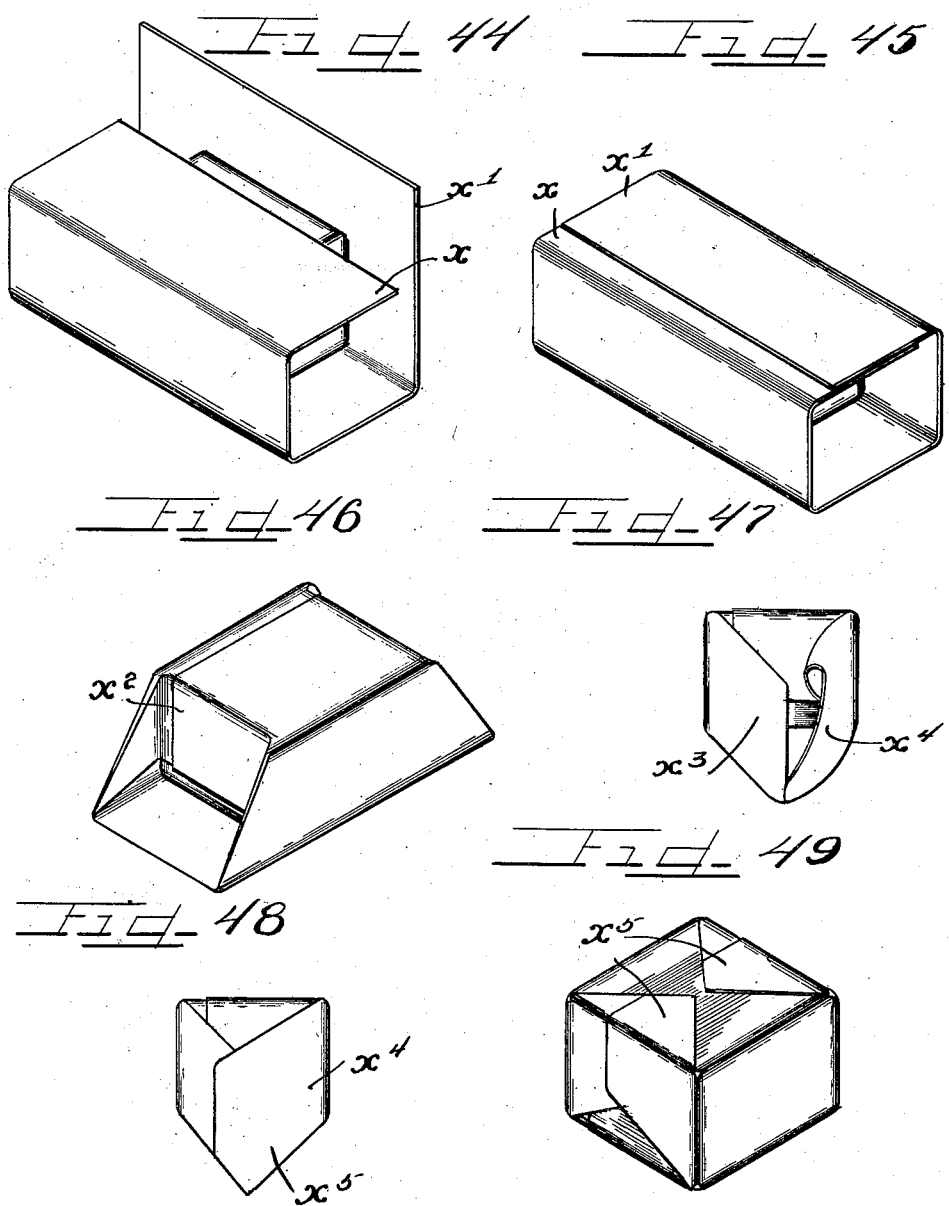

UNITED STATES PATENT OFFICE.

ARCHIBALD E. HOPKINS AND OLIN S. FELLOWS, OF MIDDLETOWN, NEW YORK, ASSIGNORS TO IDEAL WRAPPING MACHINE COMPANY, A CORPORATION OF NEW YORK.

WRAPPING-MACHINE.

1,082,463.     Specification of Letters Patent.     Patented Dec. 23, 1913.

Application filed September 3, 1907. Serial No. 391,086.

*To all whom it may concern:*

Be it known that we, ARCHIBALD E. HOPKINS and OLIN S. FELLOWS, citizens of the United States, and residents of Middletown, Orange county, New York, have invented certain new and useful Improvements in Wrapping-Machines; and we do hereby declare that the following is a full, clear, and exact description of the same, reference being had to the accompanying drawings, and to the letters of reference marked thereon, which form a part of this specification.

Heretofore many different wrapping machines have been devised some of which were designed to wrap candy caramels. These machines have not usually proved successful in use and the few that have actually been constructed and used, proved to be either too slow in operation or wasteful of the material to be wrapped or the wrapping material, or unnecessarily complicated and likely to get out of order. The machines have usually wrapped so imperfectly as to retard their general introduction into use.

With this in view the object of the invention is to construct a wrapping machine adapted to automatically wrap the articles for which the machine is particularly adapted not only to enable the operation to be performed at a much higher rate of speed, but as well to prevent waste of the material wrapped or the wrapping material and to deliver the wrapped articles from the machine in absolutely uniform packages.

A further object of the invention is to eliminate as far as possible from the mechanism the possibility of breakage by providing release mechanisms for those parts subject to stress whereby abnormal pressure acts to disconnect or partly disconnect the endangered mechanisms from the driving element therefor.

It is a further and important object of the invention to afford in connection with the wrapping machine, an improved cutting mechanism whereby the articles to be wrapped (in this instance candy caramels, although of course the machine is adapted for any other article), are delivered to the cutting mechanism in a continuous strip from which are automatically severed the candy cubes or caramels which are then automatically forced into the carrying element of the wrapping machine together with a piece of waxed paper which is automatically wrapped tightly about the same, and delivered therewith from the machine.

It is a further and important object of the invention to afford a continuously operating intermittently rotative cutting and feeding device whereby the plastic strip of caramel is brought into the machine, severed into cubes of suitable size and positioned for delivery into the carrying element.

It is a further and very important object of the invention to simplify the construction of wrapping machines in every particular and economize the power required for cutting the material to be wrapped, for wrapping and delivering the same to the discharge chute, and to so construct the machine as to enable the same to operate at a speed very much higher than has heretofore been possible for machines of this class.

It is a further and very important object of this invention to provide a machine of the class described in which the driving and operating mechanisms are protected from dust and dirt thereby preventing the machine from becoming stopped by accumulation of sugar, dust or small particles of candy which might otherwise necessitate frequently cleaning the machine.

The machine is manifestly adapted for wrapping articles of almost any nature.

The invention consists of the matters hereinafter described and more fully pointed out and defined in the appended claims.

Figure 18:
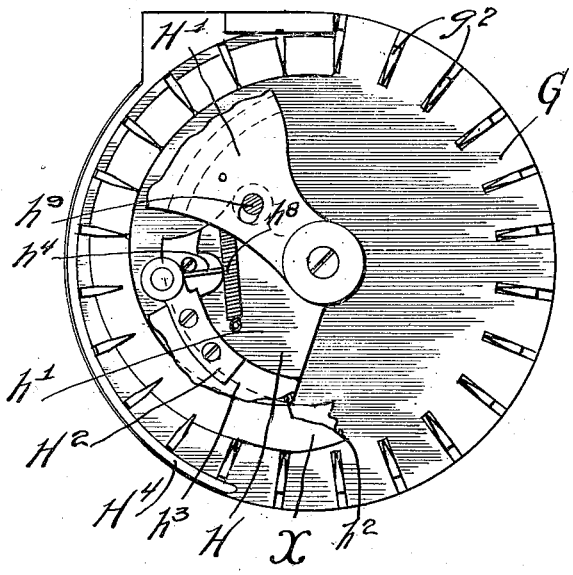

In the drawings: Figure 1 is a view in elevation of the driving side of a machine embodying our invention. Fig. 2 is an enlarged front elevation of the machine. Fig. 3 is a smaller top plan view of the same partly in section and with parts omitted. Figs. 4, 5, and 6 are sections taken on line 4—4 of Fig. 3, with parts omitted, and illustrate the operation. Fig. 7 is an enlarged section on line 7—7 of Fig. 3. Fig. 8 is a section taken on line 8—8 of Fig. 3 with parts omitted. Fig. 9 is an enlarged section on line 10—10 of Fig. 3 with parts omitted and the carrying wheel shown in elevation. Fig. 10 is a bottom plan view partly broken away. Fig. 11 is an enlarged fragmentary face view of the wrapping wheel looking into one of the pockets. Figs. 12 and 13 are sections on lines 13 and 14 of Fig. 11. Fig. 14 is a fragmentary section taken on line 15—15 of Fig. 13. Fig. 15 is an enlarged fragmentary detail illustrating the release for one of the spiral gears. Fig. 16 is a longitudinal section thereof. Figs. 17 and 18 are top plan views of the cutting mechanism showing the presser feet in horizontal section and broken away respectively. Fig. 19 is a fragmentary view in elevation taken on the left side of the wrapping wheel. Fig. 20 is an enlarged detail section showing the paper cutter. Fig. 21 is a fragmentary top plan view of the same. Figs. 22 and 23 are enlarged details of the release for the feed and discharge plunger. Fig. 24 is an enlarged sectional detail of the mechanism for forming the first top fold. Figs. 25 and 26 are details of the cam and mechanism for actuating the mechanism shown in Fig. 24 showing the relief mechanism therefor. Fig. 27 is a detail view of the folding shoe. Fig. 28 is an enlarged face view of the cam and lever for operating the feeding and discharging plungers. Fig. 29 is an enlarged fragmentary sectional view of the same taken partly in front elevation. Fig. 30 is an enlarged sectional detail of the second top folder. Fig. 31 is a longitudinal section thereof. Fig. 32 is an enlarged sectional detail of the second end folder. Fig. 33 is an enlarged top plan view of the end tuck mechanism. Fig. 34 is an enlarged end view of the same. Fig. 35 is an enlarged sectional view showing the Geneva gear and the operation thereof. Fig. 36 is an enlarged top plan view of the receiving chute and last end folding mechanism. Figs. 37, 38, 39, 40 and 41 are enlarged sectional details thereof. Figs. 42 and 43 are enlarged sectional views of the second end folder. Figs. 44 to 49 inclusive are enlarged detail views illustrating continuous operation of wrapping.

As shown in the drawings: Said machine embraces a suitable frame or table, a timing shaft, a wrapping wheel driven thereby, cutting mechanism for the caramel or other articles to be wrapped, a paper cutter, a feed mechanism for the wrapping wheel, folding mechanisms and a discharge mechanism. Said frame as shown is constructed of metal, and comprises a table A, provided with an integral downwardly extending flange $a$ on all sides thereof, at the bottom of which legs A' are attached. A relatively large aperture is provided in the top of the table for the wrapping wheel and other mechanisms which project therethrough and at one end a recess or chamber is provided in the top of the table which extends transversely the table for approximately the entire width and is of a depth and width suitable to receive the train of driving gears whereby the various mechanisms are actuated. Journaled on said table is the timing shaft B which as shown is provided with a driving pulley $b$ at one end thereof. Journaled on said shaft B is the wrapping wheel C which is provided on the side thereof opposite from the driving pulley $b$ with an elongated hub or sleeve $c$ through which said shaft B extends and which is journaled in a suitable bearing $b'$ thus affording a long bearing for said wrapping wheel on the timing shaft and in said bearing $b'$ as shown more clearly in Fig. 8. Near its opposite end said timing shaft is journaled in a bearing $b^2$. Said wrapping wheel as shown is provided with a plurality of oppositely disposed spokes as shown six (6) in number and indicated by $c^2$ the ends of which are connected with the rim $c^3$. Rectangular pockets are provided in the rim at each spoke to receive the articles to be wrapped. As shown leaf springs $c^4$, are engaged on each side of each pocket and rigidly engaged in the bottom thereof in any suitable manner and converge slightly near their outer ends and are provided with outwardly turned extremities as shown in Fig. 13 to admit the article to be wrapped therebetween and firmly engage the same, together with a piece of the wrapping paper. As shown, said outwardly turned ends of the spring blades $c^4$ extend slightly beneath plates $c^5$ engaged on the periphery of the wheel on each side of each pocket and laterally on each side of the wheel and which afford recesses to receive the free ends of said springs $c^4$. The spokes are axially cored as shown in Figs. 4, 5, 6, and 11 to 14 inclusive and slidably seated in the bore is a sleeve $c^6$, the upper end of which is of less internal diameter to afford a bearing for a spiral spring $c^7$. Through said sleeve and spring extends the stem $c^8$, of a plunger the head $c^9$ of which is rectangular as shown in Fig. 11, and affords a self adjusting bottom for the pocket. Secured on the inner end of said stem $c^8$ is a stop $c^{10}$ engaged thereon by a pin $c^{11}$ the inner end of which is of sufficient diameter to extend into the end of said sleeve affording a stop for the other end of said spring. The lower end of said stop is enlarged in size to afford a head and is provided with a rib $c^{20}$ which engages in a radial slot in the spoke to prevent the plunger turning. A spring brake is provided for said sleeve. As shown a boss $c^{12}$ is provided on the spoke near the pocket and seated in a bore in said boss is a spring $c^{14}$ one end of which bears against a key $c^{15}$ which presses against said sleeve $c^6$ and the other end of which is engaged by a set screw $c^{13}$ threaded into the outer end of the bore and whereby any desired pressure sufficient to hold the sleeve in any adjusted position may be secured. Said wrapping wheel is shaped on its side adjacent the driving end of the shaft B to permit the ends of said plungers to extend therethrough to permit engagement therewith of the actuating means therefor. Rigidly secured on the outer end of the hub $c$, of the wrapping wheel is a Geneva gear D as shown in Figs. 8, 10 and 35 which is adapted to intermittently rotate said wheel a distance equal to the distance between centers of adjacent pockets, during each rotation of the timing shaft. Said wrapping wheel is actuated as follows:—A pinion $d'$ is secured on the end of the timing shaft B beyond the Geneva gear D, and meshes with a spur gear $d^6$ which is journaled on a stud shaft $d^7$ secured on the frame or wall of the gear chamber. On the inner side of the gear $d^6$ and integral therewith are provided the actuating and the stopping means for the Geneva gear D. The driving means comprises a pin or tooth $d^8$ projecting from said gear $d^6$ at one side the center and positioned to enter the radial slot of the Geneva gear to rotate the same from its state of rest. A segment $d^{10}$ curved convexly, concentric with the shaft $d^7$ and adapted to fit in a complementally concave recess in the periphery of the Geneva gear between the radial slots therein is secured on said shaft opposite the pin to engage and hold the Geneva gear between throws thereof. Said gears and connections are so proportioned that each rotation of the shaft B produces one sixth of a revolution of the wrapping wheel beginning at rest and accelerating and then retarding to bring the wheel gently to rest without shock or jar.

Paper from a roll $E^2$ properly supported below the table is fed up from below before the wrapping wheel and a piece thereof forced into each pocket in the wrapping wheel before the caramel. For this purpose a shaft E is journaled below the table and at one end provided with a gear $e$ to mesh with a gear $d$ secured on the hub of the Geneva gear D. On the opposite end of said shaft is a gear $e'$ which meshes with a gear $e^2$ on a shaft E′ which as shown, is provided with a plurality of friction wheels or rollers $e^3$, projecting through the sides of the paper feed chute $e^4$ the upper end of which extends to a position to deliver the wrapping material before the pocket about to receive the article or caramel to be wrapped. As shown, other friction disks $e^5$ are provided on the opposite side of and project through the chute and coact with the friction wheels $e^3$.

The paper feed is intermittent owing to the driving gear therefor being secured on the Geneva gear.

The candy cutting mechanism as shown is intermittently rotated, cuts the caramel strip into cubes of the desired size for wrapping and also delivers the severed caramels into position for loading into the wrapping wheel. As shown a bearing member F is fitted into an aperture in the top of the table at the front center thereof, and is provided with a flange $f$ at its upper end which extends outwardly over the table and affords means for securing the same in place by means of a screw or screws extending through the table into said flange. Extending vertically through said bearing member concentric with the flange $f$, is a cylindric bore, of a size to receive the tubular shaft $g$ of the intermittently rotative cutting table G. Said cutting table is provided on the under side thereof with a concentric recess, in which is secured an internal gear $g^7$ adapted to mesh with the pinion $g'$ rigidly secured on the shaft $g$ which is also journaled in the bearing member F. Said cutting table is provided with 24 radial slots spaced equal distances apart and extending from the periphery inwardly to the same depth. An inwardly facing knife $g^2$ is secured in each slot by means of a headless set screw tapped into said slots from the periphery of the cutting table, thus insuring uniformity of inward adjustment. On the lower end of said shaft $g$ as shown, is a Geneva gear $g^3$ having the same number of throws as the Geneva gears D. Said Geneva gear $g^3$ is intermittently rotated from the timing shaft B by means of a pinion $d^{11}$ on shaft $d^9$ which extends through the wall of the gear case in suitable bearings and is provided with a beveled pinion $g^4$ which meshes with the beveled pinion $g^5$ rigidly secured on the lower end of a shaft $G^3$. Said shaft $G^3$ journaled in the tubular shaft $g^{10}$ extends into position to lock the Geneva gear $g^3$ from movement by engaging in suitable complemental peripheral seats arranged between the throws on said gear. Said shaft is cut away on one side to release the gear $g^3$ simultaneously with the engagement in one of the radial seats or throws of the gear $g^3$, of a downwardly directed finger or tooth $g^6$ secured near the periphery of the gear $g^5$, driven from said train of gears in the gear box. The relative proportions of the internal gear $g^7$ and the pinion $g'$ which drives the cutting table is such that each throw of the Geneva gear $g^3$ moves the cutting table the distance between adjacent knives and this movement occurs simultaneously with the movement of the wrapping wheel thereby delivering a piece of caramel into feeding position.

A chute $G^4$ extends from above the cutting table downwardly into the same between the knives and the center, and the delivery end of the chute is inclined outwardly to direct the end of the caramel strip against the knives by means of a leaf spring $g^8$ provided on the inner wall of said chute. At its upper end the shaft $G^3$ is shaped to afford a crank or eccentric journal thereon and presser feet H—H' are journaled thereon which act to firmly press the candy strip upon the knives to sever the same. The eccentric spindle or crank $g^9$ on said shaft $G^3$ projects sufficiently above the cutting table to permit the cylindric hub $h$ of the presser foot H to be journaled thereon. The relatively flat segment shaped web $h'$ of said presser foot lies close to the cutting table and at the outer periphery is provided with a raised flange $h^2$ as shown more fully in Figs. 17 and 18. At the top of said flange $h^2$ and integral therewith is an outwardly directed flange $h^3$, adapted to extend over the tops of the knives. Rigidly secured to the outer periphery of the presser foot or flange $h^2$ is a knife $h^4$ which is positioned to successively register and coact with the knives on the cutting table when in operation. Journaled on the hub of the presser foot H is the hub $h^5$ on the presser foot H'. The web of this presser foot extends over the web $h'$ of the presser foot H and is provided at its periphery with a flange $h^6$ adapted to coact with the presser foot H in forcing the caramel onto the knives. As shown also a flange $h^7$ extends outwardly over said knives. Said presser feet are yieldingly connected by a spiral pulling spring $h^8$, and also by means of a pin $h^9$ rigidly secured on the web $h'$ of the presser foot H and which projects upwardly through a transverse slot in the web of the presser foot H'.

For the purpose of controlling the movement of the presser feet to a reciprocating and slightly rolling kneading motion, a metallic plate $H^2$ is secured on the presser foot H near its outer end and a link $H^3$ is pivotally engaged at one end thereto and at the other end pivotally engaged upon a rigid bracket arm $h^{10}$, as shown in Figs. 2 and 3, thus limiting the swing of said presser feet to the movements mentioned, the outward or kneading movement occurring while the cutting table is at rest. The strip is thus pressed farther onto the knives so that with the aid of the knife $h^4$ on the presser foot H, the strip is completely severed between each pair of knives as the candy approaches the wrapping wheel.

As shown, a guard rail $H^4$ supported on the main table in any suitable manner extends around the cutting table opposite the cutting position to hold severed or broken caramels in position until ready for discharge and the rear end $h^{12}$ of the guard rail is provided with an aperture through which the caramel is delivered to the wrapping wheel and which at its rear or outer side is of a size to fit to the caramel thus breaking off any projecting pieces of the caramel.

For the purpose of cutting the paper, a cam I, is rigidly secured on the shaft B and a plate $i$ is secured on the upper side of the table A and provided with a fixed blade $i'$ projecting at the rear of the upwardly directed paper strip. Pivoted to said plate is a movable blade $i^2$ which projects along the opposite side of the paper strip and is provided with a cutting edge to coact with the corresponding edge of the blade $i'$. A lever $i^3$ secured on the blade $i^2$ projects beyond the pivot and at its outer end said lever pivotally engages a link $i^4$, the other end of which is directed at an angle therewith and is pivotally engaged on an arm $i^5$, the lower end of which extends through the table and is pivotally secured on a shaft I'. The upper end of said arm or lever is provided with an anti-friction roller $i^6$, which engages in a suitable groove in the outer face of the cam wheel I of suitable conformation for reciprocating said lever with the rotation of the shaft thus severing a piece of paper from the wrapping material sufficient to wrap the caramel and delivering the same between the wrapping wheel and the article to be delivered thereto.

Rigidly secured on the main table A is a standard K which is positioned closely adjacent the wrapping wheel and extends upwardly above the same, the top K' thereof being shaped to extend over said wheel and longitudinally in approximately the same plane therewith, to afford attachment for various mechanisms including the mechanism for loading the caramels successively into the wrapping wheel for wrapping. Links $k$—$k'$ are pivotally engaged on the downwardly turned edge of said extension K' in advance of the wrapping wheel and above the cutting table and the lower ends thereof are connected on a bar $k^2$ the end of which extends rearwardly and downwardly and the lower rearwardly directed end $k^3$ of which affords a plunger normally retracted out of the path of the knives on said revolving cutting table but which is adapted when actuated to pass between the knives positioned before the pocket in the wrapping wheel next to receive a caramel to press said article into place. For the purpose of actuating said plunger, as shown, the pivot pin or screw bolt $k^4$ connecting the rear end of said bar $k^2$ with the link $k'$ projects sufficiently to permit engaging thereto the connecting rod L.

As shown a cam wheel L' is rigidly secured on the driving shaft B, adjacent to the wrapping wheel and is provided on its inner face with a cam groove as shown more fully in Figs. 28 and 29. Journaled in a standard $l$ which is secured to and which extends below the main table A, is a stud $l'$, journaled on which is the upwardly directed lever $l^2$, which extends somewhat above the shaft B, the upper end of said lever being directed slightly rearwardly. Rigidly secured on said lever is a cylindric stud $l^3$ on which is journaled an anti-friction roller $l^4$, which fits in said cam groove and whereby said lever is operated by the throw of the cam L'. The rear end of the connecting rod L is pivotally engaged on said lever $l^2$ at a point above the timing shaft B and in consequence said connecting rod and the plunger are reciprocated by said cam with the rotation of said driving or timing shaft. Said cam groove is of such conformation that the plunger is held retracted out of the path of the knives on said cutting table while said cutting table and wrapping wheel are rotating, but is swung inwardly to press a caramel into a pocket into the wrapping wheel when said wrapping wheel and table are brought to rest by action of their respective Geneva gears, said plunger at that time registering with the opening between the two adjacent knives from which the severed article is to be delivered and with the pocket to be filled in the wrapping wheel.

For the purpose of avoiding the danger of breakage due to either the resistance of the article pressed into the pocket of the wrapping wheel or from any other cause, the rod L is provided with a longitudinal slot at its forward end, through which extends the pivot pin or screw $k^4$ before described, and said slot is shaped at its forward end to afford a bearing against said screw. Pivotally engaged on the top of the connecting rod and centrally of the slot, is a detent $l^6$, the rear end of which is bent inwardly projecting into said groove and firmly bears against the pivot pin $k^4$ above its center. The tail of said detent and the rear end of the plunger are each provided with inwardly directed projections $l^7$, adapted to engage in the opposite ends of a strong pushing spring $l^8$. The tension of such spring is such as to hold said detent firmly seated against said pivot screw during the normal operation of the machine but may permit compression by the detent to release said pivot screw when the plunger is subjected to abnormal pressure or such as would be likely to break the machine.

Said cam L' and lever $l^2$ also act to discharge the caramel from the wrapping wheel. For this purpose as shown an arm $l^9$ is rigidly secured on the lever $l^2$ and projects longitudinally of the shaft B as shown in Figs. 9, 28 and 29. In alinement with the inner ends of the plungers in the wrapping wheel when at discharge position the rearward movement of the plunger $k^3$ in loading the wrapping wheel causes said arm to engage the rear head $c^{10}$ on the plunger $c^9$ forcing the same outwardly thereby discharging the contents of the pocket.

Threaded into the downwardly turned top member or flange K' of the standard K and slightly in advance of the wrapping wheel is a stud shaft M provided with an integral collar $m$ which bears against said flange. Said shaft protrudes on the inner side of said flange and is reduced slightly in diameter as shown in Fig. 24 affording a bearing $m'$ for a rocker arm $m^2$, at the lower end of which is pivotally engaged a rearwardly directed shoe M', having an upwardly directed crank $m^3$ at its pivoted edge. A spring controlled roller $m^4$ adapted to travel on the periphery of the wrapping wheel is provided on the rear end of the shoe and acts to make the first top fold. As shown the end of said shoe is recessed to receive said roller which is secured on a spindle $m^5$ the ends of which are journaled in suitable seats in the inner ends of set screws $m^6$, on opposite sides of the shoe, and as shown, a relatively weak coiled spring $m^{20}$ is engaged around said spindle and to the roller $m^4$ and also to a fixed point on the shoe. The tension of the spring is adjusted to permit the roller to rotate when pressed against the periphery of the wrapping wheel and moved rearwardly but when the shoe rests at the end of its rearward folding movement the torsion of said spring rotates said roller in the opposite direction as the wheel carries the partly wrapped article from beneath the roller and tends to draw the paper tight and to hold the same until engaged by the next fold and then the rocker shoe and roller are swung upwardly and retracted preparatory to making another fold. Said shoe is actuated by means of a bell crank journaled on the shaft M, one arm $M^4$ of which is slotted at its end to engage the crank $m^3$, permitting some freedom of movement of the shoe vertically. Journaled at its lower end on the shaft I' and projecting upwardly on the inner side of the cam wheel I is a lever $M^5$, which is provided near its upper end with a cylindric stud shaft $M^6$ provided with an anti-friction roller which fits in a cam groove in the inner side of said cam wheel, to actuate the lever thereby. Hinged at the upper end of said lever $M^5$, and as shown below the stud $M^6$ is a bar $m^7$, which forms an extension of the lever and is normally held from movement relatively to said lever in one direction by engagement thereagainst at the top. Secured on the upper end of the lever $M^5$, and extending through a suitable aperture in the bar $m^7$, is a rod $m^8$, which as shown is curved concentrically with the pivot $m^{21}$ or hinge for said bar. A pushing spring $m^9$ is secured thereon and at one end bears against said bar and the other bears against a suitable nut or collar $m^{10}$ on the end of the rod $m^8$ enabling said lever to yield to undue pressure by compressing the spring. Pivotally engaged at the upper end of said extension bar $m^7$ and connected with the other arm $m^{11}$ of said bell crank is a link $m^{12}$. The groove in the cam wheel I is of such conformation as to move the shoe rearwardly when forming the top fold with considerable speed and pressure, and just before the second top fold is formed means are provided for exerting yielding pressure against the bearing of the rocker arm $m^2$ of said shoe on its bearing embracing a set screw $m^{13}$ engaged through the standard K and bearing against a suitable cap $m^{14}$ which in turn presses a spring $m^{15}$ which fits over the end of the shaft $m'$ and firmly against the head of the lever $m^2$. The shoe forming the first top fold firmly holds the fold until the other projecting edge of the paper is engaged to form the second top fold and is then swung upwardly out of engagement with the paper as shown in Fig. 6. The roller $m^4$ by its reverse rotation exerts a pull on said paper, drawing it tight, just at the moment that the second fold is made.

To form the second top fold a curved arm N, is pivotally attached near the lower edge of the top flange $K'$ of said standard and is directed rearwardly, and pivotally engaged thereon at its lower end and conforming to the periphery of the wrapping wheel, is a shoe $n$, to the under side of which is rigidly secured a leaf spring $n'$, curved to fit the periphery of the wrapping wheel and extending rearwardly, as shown to near the point of discharge. Said shoe is yieldingly supported on the end of said arm N, on the pivot pin $n^2$, by means of a torsion spring $n^3$ seated in a recess in the forward edge of the shoe the ends of which bear against the shoe and said arm holding the shoe with some pressure but yieldingly upon the wheel. Said arm N is also yieldingly held down in operative position by means of a spring tension embracing a rod $n^4$, secured on the top of said arm and projecting upwardly through an apertured lug $n^5$ on the top of the standard and between which and said arm is provided a strong pushing spring $n^6$. For the purpose of varying the adjustment of said arm, nuts $n^7$—$n^8$ are provided on said rod which is threaded to receive the same. Said spring $n'$ acts to hold the top folds firmly while the end folds are formed.

In forming the first end fold or as it will be termed the end tuck, a sleeve $O^5$ is provided at the rear end of the longitudinal extension or flange $K'$ above the wrapping wheel and journaled therein is a shaft O on the end of which above and directed rearwardly of the wrapping wheel is secured an arm $O'$. Said arm is yieldingly secured on its shaft by means of a torsion spring $o'$ one end of which is engaged to a collar $o^2$ on said end of the shaft and the other is firmly engaged to the arm $O'$ as shown more clearly in Fig. 33. Said arm is secured somewhat loosely on the shaft but may be keyed if the key seat in the hub of the arm be made somewhat wider than the key engaged in the shaft though the torsion of the spring is ordinarily sufficient to hold the end of said arm in operative position under normal pressure. At the outer and rearwardly directed end of the arm are downwardly directed tucking blades or fingers $O^2$ which fit over the end of the caramel as shown in Figs. 4 and 7, making the tuck in each end simultaneously. At the opposite end of said shaft is adjustably secured a crank arm $o^3$ to which is engaged a connecting rod $o^4$ which also pivotally engages the upper end of the lever $l^2$, so the rearward movement of said cam lever in filling a caramel into and discharging a caramel from the wheel also actuates the tucker arm in forming said end tuck.

The first end folding mechanism is actuated from the timing shaft at one end of which is a sprocket wheel $d^2$ as before described and around which extends a sprocket chain $p$, which is also trained about a sprocket wheel $p'$ rigidly secured on a shaft P which as shown in Figs 7, 8, 9 and 10 is journaled below the main table in a suitable bearing secured thereto and the sprocketed end of which projects into the gear case or box. Secured on the table A at the rear of the timing shaft, as shown, and one on each side of the wrapping wheel, are tubular standards $P'$ and $P^2$, in each of which is journaled a vertical shaft $P^3$ and $P^4$ respectively, on the lower end of each of which as shown in Figs. 8 and 9 is a beveled or miter gear $p^2$—$p^3$, which mesh respectively with complemental gears $p^4$—$p^5$ secured on the shaft P and whereby the shafts $P^3$ and $P^4$ are rotated constantly from the timing shaft. Adjustably secured on the upper end of each of said shafts $P^3$—$P^4$ is a spiral gear $p^6$ and $p^7$ respectively, and on the extremity of each of said shafts is a nut and jam nut $p^8$ whereby said gears are rigidly engaged to the shaft when the mechanism driven thereby is properly adjusted and timed. Journaled in suitable bearings at the top of each of said standards are longitudinally alined shafts $P^5$ and $P^6$, the ends of which are directed to near the opposite faces of the wrapping wheel as shown in Figs. 8 and 9. A spiral gear $p^9$ shown more clearly in Figs. 15 and 16, is secured on each of said shafts to permit longitudinal adjustment of the shaft therein as well as a slight rotational movement and mesh respectively with the spiral gears $p^6$ and $p^7$ to rotate said shafts $P^5$ and $P^6$ in a direction corresponding with the direction of the wrapping wheel. To accomplish the longitudinal and rotational movement or relief of said shafts $P^5$ and $P^6$ the spiral gears $p^9$—$p^9$ are each provided on each end with a hub $p^{10}$ and $p^{11}$, as shown in Figs. 15 and 16, affording a sleeve through which the shaft extends, and as shown the bore of said sleeve from the hub $p^{10}$ inwardly, is sufficiently larger than said shaft to receive a compression and torsional spring $p^{12}$ therein, one end of which is rigidly secured to the shaft and the other end of which is secured under compression to a collar $p^{13}$ fitted on the end of said shaft and in said sleeve, and provided with pins $p^{14}$, which extend from said collar outwardly through peripheral slots in the hub, as shown in Fig. 15. The opposite hub $p^{11}$ is provided with an aperture of considerable length and width, and rigidly secured in the shaft is a pin $p^{15}$ which projects into said aperture and acts to limit the adjustment of said shafts toward the wrapping wheel, due to the compression of the springs, but permits said shafts to be pressed longitudinally of said sleeve away from the wrapping wheel. On the end of each shaft closely adjacent the wrapping wheel and in position to swing past the end of each pocket, is a finger $P^7$, which as shown is rounded transversely, and, as shown in Fig. 7, is curved slightly rearwardly. Said shafts rotate constantly in the same direction with the wrapping wheel and the fingers $P^7$ are so adjusted thereon as to engage the wrapper to begin the first end fold just as the end tuck mechanism is being retracted and just before the intermittent movement of the wrapping wheel begins, and completes the inward folding of the wrapper after the intermittent rotation begins and just as the package recedes to be received by the second end fold mechanism. Should a caramel be so disposed in the pocket as to project beyond the side of the wrapping wheel, the longitudinal relief of the end fold shaft permits the same to be pressed back against the compression of the springs $p^{12}$ and, if the compression of the finger or arm is sufficiently great, the same may be held from rotation momentarily until clear of the caramel. The springs of course return the shafts to normal position. As shown in Figs. 8 and 9, caps $p^{16}$ are secured to cover the spiral gears and the bearings therefor, affording within the same and in the top of the standard an oil well permitting the gears at all times to run in oil.

The second end fold is accomplished by means of side shoes Q and Q' which press against opposite sides of the wrapping wheel at a point to receive the caramel therebetween just as the first end fold is completed. Said side shoes are of a length to press against the ends of the caramel until the caramel is delivered from the wheel. As shown in Fig. 7 the side shoe Q on the right side of the wrapping wheel, is pivotally engaged on an arm $q$, hinged to a base plate $q'$ removably secured to the table A. As shown a strong torsion spring $q^2$ is engaged on the hinge pintle $q^3$ which is engaged at its ends on the arm $q$ and base $q'$ and acts to press the side shoe against the wrapping wheel.

The side shoe Q' as shown in Figs. 3 and 9, 42 and 43, is pivotally engaged to the boxing $b'$ for the timing shaft and wrapping wheel by means of a suitable arm $q^4$ and projects rearwardly against the left side of the wrapping wheel. As shown, a spring $q^5$ also engaged on said boxing presses against the arm $q^4$ to yieldingly hold said shoe in operative position against the wrapping wheel. Between said side shoes with all except the last end fold formed the wrapped caramel is delivered by the wrapping wheel into position to be discharged into a receiving chute R which is suitably supported at the rear of the machine in alinement with, and at the same height relatively with a short chute R' secured on the table A and into which the caramel is delivered. Said chute section R' comprises a rigid bottom plate, a resilient top member $r$, and resilient side members $r'$ to yieldingly engage the ends of the caramels, to hold the folds, exercising slight pressure against the same.

Pivotally supported on each side of the chute section R' are forwardly directed arms S and S' which at their extremities, just beyond the forward ends of the chute section, are provided with inwardly directed folding blades $s$ adapted to close just in advance of the chute as shown in Fig. 36 as the caramel passes thereinto thereby engaging and forming the last end fold. The rear end of said arms are each provided with inwardly directed levers $s'$ and $s^2$ which are pivotally connected by means of a link $s^3$ thereby necessitating simultaneous and opposite movement of said arm when actuated. Rigidly secured on the arm $s^2$ is a laterally directed arm $s^5$ on the extremity of which is provided an upwardly directed pin $s^4$. Said pin engages in a longitudinal slot in a link or connecting rod $S^2$, the forward end of which is pivotally engaged at the upper end of the lever $l^2$ whereby the caramels are delivered into the wrapping wheel and discharged therefrom and which also actuates the end tuck mechanism. As shown, also, a strong pulling spring $s^6$ is engaged on said connecting rod $S^2$ at one end, and at the other end is engaged to the extremity of said arm $s^5$, thus affording relief for said connection. A relief is also provided for the folding blades $s$ so that should the same be caught by a projecting caramel not properly discharged from the wrapping wheel the same may yield downwardly to permit the caramel to pass as shown in Figs. 37 to 39 inclusive. For this purpose the outer end of each arm S—S' is provided with a longitudinal sleeve $s^7$ affording a bearing for a shaft $S^3$ which projects therethrough in alinement with the arm but below the same, and on its forward end carries one of said blades $s$. The sleeve $s^7$ is notched or cut away peripherally to receive a pin $s^8$ rigidly secured to the blade $s$ and to permit a considerable rotational movement of said shaft $S^3$ in said sleeve. At the inner end of said shaft $S^3$ is a nut or collar $s^9$ which engages a coiled pushing spring $s^{10}$ on said shaft, one end of which is engaged to the sleeve, and the other of which is engaged to the collar or nut, tending to hold said blade normally in an elevated position should they be swung downwardly from normal by an imperfectly delivered or imperfectly formed or wrapped caramel.

Engaged on the forward end of the chute section R' and secured to the table A is a hinged bottom section T, the pintle $t$ on which the same is pivoted being provided with a torsion spring $t'$ which permits said section to be turned downwardly to release any object which might otherwise jam in the chute, as for instance an imperfectly wrapped caramel, or one irregular in size or shape.

The operation is as follows: It is evident that the timing shaft and all parts rigidly engaged thereon rotates continuously and that the Geneva gears and all parts actuated thereby rotate intermittently, the same being timed from the timing shaft. In wrapping caramels or material of a like nature, a strip of the material is fed to the cutting mechanism, which intermittently rotates the presser feet thereon, gradually kneading and pressing the candy or other material upon the knives and severing the same into cubes or pieces of the desired size, the back knife on the presser foot H coacting with the successive knives on the cutting table and preventing irregular breaking of the material. The cutting table and wrapping wheel are timed so that the successive cubes of the material to be wrapped are delivered to the successive empty pockets in the wheel, said cut pieces between successive knives on the cutting table registering successively with an empty pocket in the wrapping wheel when each is stationary. In this position the paper having been fed upwardly between the pocket and the caramel, the cam L' actuates the lever $l^2$ and thereby the plungers connected therewith, the one to force the caramel with the paper into the pocket, the other to discharge the caramel diametrically opposite into the discharge chute, at the same time retracting the last end folding blades, as shown in Fig. 3 to permit the delivery to the chute. In pressing with the wrapping material into the pocket, the plunger $k^3$ passes the caramel against the plunger $c^9$ forming the bottom of the pocket moving both rearwardly until the outer face of the caramel is about flush with the periphery of the wheel. The automatic stop on said plunger $c^9$ holds the same in adjusted position to afford a self adjusting bottom for the pocket insuring perfect wrapping even for caramel pieces, the thickness of which is not uniform. It is also evident that the aperture in the guard rail $h^{12}$ through which the caramels are passed causes the guard to act as a die to break any irregularities from each piece, and, should the pieces be so large or so irregular as to preclude the ready passage through the guard rail or proper insertion into the pocket, the release mechanism for the plunger $k^3$ operates instantly preventing breakage. Having filled the pocket the plunger $k^3$ is retracted and the next rotation of the wrapping wheel brings the next pocket to filling position and the caramel is passed into the pocket with the edges of the paper extending radially from the periphery of the wheel into position to be engaged by the rocker shoe M' adapted to form the first top fold. During the rest of the wrapping wheel and while as shown in Fig. 4 one pocket therein is again being filled and another discharged, the rocker shoe M' by means of the cam I and lever $M^5$ is actuated. The rear end of the rocker arm swings downwardly upon the periphery of the wrapping wheel until the roller $m^4$ exerts some pressure thereon, and then the cam acts to swing the said rocker shoe rearwardly carrying the roller onto the projecting margin of the wrapper folding the same rearwardly as indicated by $x$ in Fig. 44 and incidentally winding up the torsion spring engaging said roller. Should the roller strike an abnormally projected caramel the hinged joint in the lever $M^5$ may yield sufficiently against the tension of the spring $m^9$ to prevent breakage, but said rocker shoe yieldingly follows the contour of the surface with which engaged. When the roller reaches the rearward limit of movement a slight interval of rest occurs, during which the intermittent motion of the wrapping wheel begins again, permitting said roller under tension of its spring to reverse its rotation as the second top fold is pressed over the first by the rearward margin of the wrapper being carried beneath the shoe $n$. Said spring in said roller acts to draw the first top fold $x$ rearwardly with considerable tension, holding the same positively until engaged by the second top fold $x'$ and beneath the shoe $n$. The rear end of the rocker shoe now tilts up sufficiently as shown in Fig. 6 to swing entirely clear of the periphery of the wrapping wheel, during which time it is retracted into position for the rocker shoe to begin another folding movement. The use of the torsional roller insures tight and perfect wrapping of the article as it obviates all tendency to frictionally retract the first fold before forming the second. During the next intermittent movement of the wrapping wheel the operation just described is repeated and the caramel, having both top folds completed, is arrested beneath the tucker blades O² on the arm O', which is actuated from the same cam that actuates the loading and discharge plungers, and is swung downwardly, as shown in Fig. 4, simultaneously with the rearward movement of the plungers engaging the top fold at each end of the caramel, and pressing the same downwardly forming the end tucks as shown at $x^2$ in Fig. 47. During the retraction of the tucker blades and just before the beginning of the next intermittent movement of the wrapping wheel the revolving arms or blades P⁷, driven from the spiral gears on each side of the wrapping wheel, engage the projecting ends of the paper from in front and begin the formation of the first end fold $x^3$, Figs. 5 and 47. This operation begins before the tucker blades are entirely retracted and before the next movement of the wrapping wheel and continues after the beginning of such movement until the fold is completed and the rear projecting ends of the wrapper are carried beneath the side shoes Q—Q'. This forms the second end fold $x^4$ Fig. 48 over the end fold $x^3$ and holds the folds until delivery from the wrapping wheel, as shown in Fig. 48, in which position the caramel is carried to the discharge position.

In discharging the package the arm $l^9$ engages the head $c^{10}$ on the plunger and forces the plunger outwardly discharging the caramel thereby into the chute, the rearward movement of the cam lever $l^2$ also actuates the bars S—S', the blades $s$ of which are retracted to admit the caramel therebetween, and swinging inwardly engage the wrapper to form the last end fold $x^5$ which is turned over the front as shown in Fig. 49.

The plunger after discharging the caramel is retracted by its spring to the periphery of the wrapping wheel ready to receive another caramel with its wrapper. Should a plunger spring $c^7$ break, the plunger will be pushed back to receiving position by a downwardly projecting lip $y$ on the under side the table A, shown in Figs. 4 to 6 but which normally is not contacted by the plungers.

The Geneva gear driving the wrapping wheel is so constructed as to stop the wheel without jar, lock the same from movement during its interval of rest and to start the same at a relatively slow rate accelerating the speed for half the movement and retarding for the remainder bringing the wheel to rest gently but quickly. Two hundred fifty such movements per minute and consequently a capacity of two hundred fifty caramels perfectly wrapped per minute, are thus easily within the capacity of the machine. As shown, one such movement of the wrapping wheel occurs to each rotation of the timing shaft and each of the cams on said shaft are constructed to move the element actuated thereby at an accelerated then retarded rate in coöperating with the wrapping wheel. This also tends to prevent jar or vibration at high speed.

Of course details of construction may be varied. We therefore do not purpose limiting this application for patent to the specific details shown and described or otherwise than necessitated by the prior art.

We claim as our invention:

1. In a machine of the class described, the combination of a continuously rotating timing shaft of an intermittently rotating wrapping wheel driven therefrom, and having pockets in its periphery, an automatically adjustable bottom for each pocket, means actuating said bottom to project beyond the periphery in ejecting and means retracting said bottom to the periphery after ejection.

2. In a machine of the class described, the combination with a rotating wrapping wheel having pockets in its periphery of an automatically adjustable bottom in each pocket, means projecting said bottom beyond the periphery of the wheel to eject the contents from the pocket, a spring acting to retract the bottom and a friction sleeve adapted to stop the bottom approximately at the periphery of the wheel after the ejection.

3. In a machine of the class described, the combination with a timing shaft of a wrapping wheel having pockets in its periphery, a movable bottom in each pocket, friction means normally supporting said bottom approximately at the mouth of each pocket, a spring adapted to return the bottom to normal after being moved from said position in one direction and means operated from the timing shaft for varying the rate of motion of the wrapping wheel to successively accelerate from and retard the same to rest at loading position.

4. In a machine of the class described, the combination with a rotative timing shaft of an intermittently rotating wrapping wheel having pockets in its periphery, a movable bottom in each pocket, a weak spring engaged on each to normally retract the bottom to the mouth of the pocket after the discharge of its contents, and friction means for retaining the bottom at the mouth of the pocket.

5. In a machine of the class described, the combination with a wrapping wheel having one or more pockets in its periphery, of a movable bottom in each pocket, a light spring engaged beneath each bottom and adapted to move the bottom inwardly after discharging its contents, means pressing said bottom outwardly in discharging the contents of the pocket and means adapted to arrest the inward movement of the bottom in position for said bottom to approximately close the pocket.

6. In a machine of the class described, the combination with a continuously rotating timing shaft of an intermittently rotating wrapping wheel having pockets in its periphery, mechanism operated from the timing shaft to drive the wrapping wheel at an accelerating rate from rest and a retarding rate to rest and locking said wheel at rest with its pockets successively at filling and emptying positions, means adapted to exert a regulable pressure on the filling material to force the same into a pocket and releasable at pressure in excess of that for which adjusted and means connected with and simultaneously movable with said means for emptying the pockets successively.

7. In a machine of the class described, the combination with a continuously rotating timing shaft, of an intermittently rotating wrapping wheel driven thereby and accelerated from and retarded to its periods of rest to stop the same without shock, wrapping mechanisms coacting with said wrapping wheel, cams on said timing shaft connected to actuate said wrapping mechanisms, said cams being so constructed as to afford accelerating followed by retarding movement coinciding with said movement of the wrapping wheel, feeding means acting to deliver the material to be wrapped into successive pockets, and regulable means for throwing said feeding means out of action entirely independently of the action of any of other mechanisms upon encountering abnormal resistance.

8. In a mechanism of the class described, a wrapping wheel having peripheral pockets, a continuously rotating timing shaft, a Geneva gear rigidly connected with the wrapping wheel and having in one face radially directed slots, in number corresponding with the number of pockets in the wrapping wheel, an actuating male member therefor adapted to engage in successive slots and affording accelerating followed by retarding motion, means on said male member locking the wheel from movement when at rest, and regulable feeding means adapted to be set to exert a predetermined pressure and to be thrown out of operation independently of any other parts of the machine at excess pressure, acting successively to fill the pockets during the periods of rest.

9. In a device of the class described, the combination with a wrapping wheel having pockets in its periphery, a standard projecting above the wheel, parallel links depending from said standard, a plunger supported thereon to swing horizontally, means acting to deliver a piece of material to be wrapped and the wrapper before the plunger in operative position for insertion into a pocket in said wheel, a cam acting on said plunger to force said material and the wrapper into the pocket and a relief mechanism engaging the plunger with its actuating means and adapted to yield to abnormal pressure.

10. In a device of the class described, the combination with a rotative wrapping wheel having pockets in its periphery, of a standard secured adjacent the wheel, parallel links pivoted to said standard, a plunger supported thereon to swing horizontally on said links, means delivering a piece of wrapping material and the material to be wrapped between the plunger and the pocket, means retarding the wrapping wheel as the pockets approach filling position, a cam actuating said plunger to force said material and its wrapper into a pocket in said wheel, and a spring detent yieldable to abnormal pressure and adapted to be set to release the plunger at a given pressure.

11. In a device of the class described, the combination with a timing shaft of a rotative wrapping wheel having pockets in its periphery, a standard adjacent the wheel, parallel links secured to said standard, a plunger supported on said links to swing horizontally, means acting to deliver a piece of wrapping material and material to be wrapped between the plunger and the pocket, a cam on the timing shaft acting on said plunger to impart variable motion in forcing said material and wrapper into one of said pockets, and a spring controlled relief mechanism whereby the plunger yields to abnormal pressure.

12. In a device of the class described, a timing shaft, a rotative wrapping wheel having peripheral pockets, a plunger positioned to fill the pockets successively, actuating means for the plunger and a relief mechanism embracing a spring detnet connected with the actuating means and engaging the plunger and adapted to release at abnormal pressure.

13. In a machine of the class described, the combination with a wrapping wheel having pockets in its periphery, of radially disposed plungers therein, one for each pocket, the head thereof forming the bottom of the pocket, a sleeve slidably engaged in the wheel, and in which said stem of the plunger is yieldingly engaged, and a friction brake for the sleeve.

14. In a machine of the class described, the combination of a wrapping wheel having pockets in its periphery, of radially disposed plungers, one for each pocket, the head thereof forming the bottom of the pocket, sleeves slidably engaged in the wheel one for each plunger and in which the stem of the plunger is slidably and yieldingly engaged and a resilient friction brake for each sleeve.

15. In a machine of the class described, the combination of a wrapping wheel having pockets in its periphery, of radially disposed plungers, one for each pocket, the head thereof forming the bottom of the pocket, a sleeve for each plunger slidably engaged in the wheel and in which the stem of the plunger is engaged to permit limited motion, a spring on the stem within the sleeve and a friction brake for the sleeve adapted to hold the same in adjusted position until subjected to operative pressure.

16. In a machine of the class described, a rotative element having pockets in its periphery, springs affording yielding side walls for said pockets, an automatically adjustable bottom for each pocket, adapted to vary the depth thereof, to suit the thickness of the article to be wrapped, a spring acting to draw said bottom inwardly to near the mouth of the pocket and yieldable means for stopping the bottom near the mouth of the pocket.

17. In a machine of the class described, a rotative wrapping wheel having pockets in its periphery, springs affording the side walls for said pockets, an automatically adjustable bottom for each pocket, adapted to vary the depth thereof according to the requirement of the article to be wrapped, a spring acting to draw each bottom inwardly to near the mouth of the pocket, and a friction stop acting on each bottom to resist movement of said bottom in excess of the limits permitted by said spring.

18. In a machine of the class described, a rotative wrapping wheel having pockets equally spaced in its periphery, leaf spring yielding side walls for said pockets, laterally extended plates at the periphery at each side of each pocket affording a recess therebeneath for the edges of the leaf springs, an automatically adjustable bottom for each pocket adapted to vary the depth thereof according to the requirements of the article to be wrapped, a spring pressed friction key holding the bottom in adjusted position and a stop limiting the movement of the bottom in each direction.

19. In a machine of the class described, a wrapping wheel having pockets in its periphery, leaf springs affording resilient side walls therefor, radial plungers, the heads of each forming an automatically adjustable bottom for a pocket, a spring acting to draw each plunger inwardly, and a regulable spring brake for each plunger acting independently of the spring adapted to yieldingly resist inward pressure in filling the pocket.

20. In a machine of the class described a wrapping wheel having pockets in its periphery, leaf springs affording resilient side walls therefor, plungers forming an automatically adjustable bottom for each pocket, a movable friction sleeve through which the stem of each plunger extends, a brake for each plunger adapted to resist inward pressure in filling the pocket embracing a key frictionally engaging the sleeve, a bore in said wheel, a spring therein forcing the key against the sleeve and a set screw for adjusting the spring to vary the frictional engagement of the key against the sleeve.

21. In a machine of the class described, the combination with a wrapping wheel having pockets in its periphery, of a plunger affording an automatically adjustable bottom in each pocket, a spring drawing the same inwardly, a brake acting on the plunger to resist movement thereof greater than permitted by compression of said spring, means delivering the material to be wrapped into position for insertion into a pocket, and a feed plunger acting to press the same into the pocket and to adjust said bottom plunger inwardly to the thickness of the article to be wrapped.

22. In a machine of the class described, the combination with a wrapping wheel having pockets in its periphery of an automatically adjustable bottom in each pocket, means delivering the article to be wrapped together with the wrapping material in filling position before the pocket, a plunger acting by pressure thereagainst to adjust said bottom to the thickness of the article to be wrapped, a spring controlled release mechanism for said plunger and a yielding, regulable brake for said bottom, the same acting conjointly to prevent breakage.

23. In a machine of the class described, the combination with a wrapping wheel having pockets in its periphery, of plungers radially disposed in the wheel, the heads thereof affording the bottoms of the pockets, a friction brake for each plunger and means affording a limited movement of each plunger independently of the brake in discharging the contents of the pocket.

24. In a machine of the class described, a wrapping wheel having pockets in its periphery, plungers radially disposed in the wheel, the heads thereof affording the bottoms of the pockets, a friction brake resisting movement of each plunger, in either direction, a spring acting to hold each plunger inwardly and permitting movement thereof outwardly in discharging independently of the brake, said spring retracting the plunger after discharge, and the brake regulable to yield to predetermined pressure in filling the pocket, sufficiently to adapt the same to the thickness of the article to be wrapped and a positively actuated arm adapted to engage behind the plunger, and acting to force the same outwardly beyond the periphery in discharging the wrapped article, said spring then acting to retract the plunger head to near the periphery of the wheel.

25. In a machine of the class described, a wrapping wheel having pockets in its periphery, automatically adjustable plungers radially disposed in the wheel, the heads thereof affording the bottoms of the pockets, a friction brake for each plunger, resisting movement in either direction but adapted to yield to predetermined pressure, a spring acting independently of the brake to afford limited movement of the plunger and adapted to yield to pressure less than that exerted by the brake, and positively actuated means adapted to engage behind the plunger and acting to force the same outwardly against the compression of said spring in discharging the pocket, said brake then acting to hold the plunger in loading position.

26. In a machine of the class described, a wrapping wheel having pockets in its periphery, plungers radially disposed in said wheel, the heads thereof affording adjustable bottoms for the pockets, a brake yieldingly controlling the inward adjustment of each plunger to the thickness of the article to be wrapped, a spring acting to retract each plunger to the limit determined by the brake, reciprocating means adapted to press the articles with the wrappers into said pockets, mechanism adapted to limit the pressure to be exerted by said means in filling the pockets, and a positively actuated arm adapted to force the plungers outwardly in discharging the pocket.

27. In a machine of the class described, a wrapping wheel having pockets in its periphery, plungers radially disposed in said wheel, the heads thereof affording adjustable bottoms for the pockets, a brake yieldingly controlling the inward adjustment of said plungers to the thickness of the articles to be wrapped, a spring normally holding the plungers retracted to the limit permitted by the brake, means for delivering the article to be wrapped into filling position, reciprocating means adapted to press the articles each with its wrapper into successive pockets, adjustable release mechanisms adapted to limit the pressure capable of being exerted by the filling mechanism in filling the pockets and a positively actuated arm adapted to engage behind each of the plungers to force the same outwardly in discharging the pocket, said brake and spring then acting to hold the plunger head at the mouth of the pocket until pressed back to accommodate the article to be wrapped into the pocket.

28. In a machine of the class described, a wrapping wheel having a pocket in its periphery, a movable bottom in said pocket, means pushing the bottom out beyond the mouth of its pocket in ejecting the contents of the pocket and automatic means retracting said bottom to about the mouth of the pocket thereafter.

29. In a machine of the class described, a wrapping wheel having pockets in its periphery, plungers radially disposed in said wheel, the heads thereof affording adjustable bottoms for the pockets, means yieldingly controlling the inward adjustment of said plungers to correspond with the thickness of the article to be wrapped, reciprocating means adapted to press the article with its wrapper into the pocket, mechanism adapted to limit the pressure capable of being exerted thereby in filling the pockets, a positively actuated arm adapted to engage behind successive plungers to force the same outwardly in discharging the pocket, and a guide acting to press said plungers inwardly should they protrude beyond the wheel when approaching filling position.

30. The combination of a wrapping wheel having pockets in its periphery, automatically adjustable means regulating the depth of the pocket to the thickness of the article to be wrapped, a plunger for filling the pockets, successively, mechanism connected therewith adapted to release the plunger at abnormal pressure, wrapping mechanism coacting with said wrapping wheel in wrapping the package in each pocket successively, mechanisms connected with each adapted to yield to abnormal pressure, and an arm movable with the filling plunger and acting on the bottom of each pocket to discharge the wrapped article therefrom.

31. The combination with a rotative wrapping wheel having pockets in its periphery of automatically adjustable means regulating the depth of the pockets to the thickness of the articles to be wrapped, rotative means delivering the articles to be wrapped to filling position, a plunger acting to force the articles into successive pockets, mechanism acting to throw the plunger out of action at a predetermined pressure, wrapping mechanisms acting to fold the wrapper about the articles to be wrapped in each pocket successively, each of said mechanisms being adapted to yield when subjected to abnormal pressure and an arm connected with the filling plunger and acting on the bottom of each pocket to discharge the wrapped article therefrom independently of the action or non-action of the filling plunger.

32. The combination with a rotative wrapping wheel having pockets in its periphery, of a standard projecting above the wheel, parallel links pivoted on said standard, a plunger pivotally engaged on each of said links to swing horizontally, an oscillating lever, a rod connecting said lever and plunger, and having a longitudinal slot at one end in which one of said elements is pivotally engaged, a detent pivoted on the connecting rod and bearing against said pivot in said slot and a spring holding said detent normally in engagement with said pivot, but permitting release of the plunger to throw the same out of operation when the plunger encounters abnormal resistance.

33. The combination with a rotative wrapping wheel having pockets in its periphery, of a standard projecting above the wheel, parallel links pivoted on said standard, a plunger pivotally engaged on each of said links to swing horizontally, an oscillating lever, a rod connecting said plunger and lever, said connecting rod having a longitudinal slot at one end, a cylindric stud on one of the elements engaged by said rod and projecting into said slot, a detent pivoted on the connecting rod and bearing said stud against the end of the slot, affording a bearing therefor, a projecting end on said detent and a spring engaging the same and the rod and normally holding said stud in bearing but permitting release by said detent throwing the plunger out of action should the plunger encounter abnormal resistance.

34. The combination with a rotative wrapping wheel having pockets in its periphery, of a standard projecting above the wheel, parallel links pivoted on said standard, a plunger pivotally engaged on said links to swing horizontally rotative means delivering the articles to be wrapped between the plunger and wheel, a stud on the plunger engaging a connecting rod having a longitudinal slot near its end in which said stud projects and a spring controlled detent pivoted on the connecting rod and bearing said stud against the end of the slot, and acting to release the plunger from said rod when abnormal pressure is applied to the plunger thereby throwing the plunger out of action.

35. In a machine of the class described, the combination of a rotative wrapping wheel, having pockets in its periphery of radial plungers in said wheel, the heads thereof forming the bottoms of said pockets, means acting to hold said plungers in adjusted position to vary the depth of said pockets, an arm acting to move said plungers outwardly in discharging the pocket and positioning said plunger heads at the periphery of the wheel after such discharge, and a guide in operative relation with the wrapping wheel adapted to press said plungers inwardly should they project beyond the periphery of the wrapping wheel after the discharge.

36. In a machine of the class described, the combination of a rotative wrapping wheel having pockets in its periphery, of radial plungers slidable therein, the heads thereof forming the bottom of said pockets, means acting to hold said plunger heads in adjusted position to vary the depth of said pocket and outwardly at the periphery of the wheel after the discharge of the contents of the pocket, and a guide located near the filling position of the pockets and in operative relation with the wrapping wheel and adapted to press said plungers inwardly should they project beyond the periphery of the wrapping wheel after the discharge.

37. In a machine of the class described, the combination of a rotative wrapping wheel, having pockets in its periphery, of radial plungers slidable in said wheel, the heads thereof forming the bottoms of said pockets, means acting to hold said plungers in adjusted position to vary the depth of said pocket or outwardly at the periphery of the wheel after the discharge of the contents of the pocket and to resist inward pressure thereon, a guide in operative relation to the wrapping wheel adapted to press said plungers inwardly should they project beyond the periphery of the wrapping wheel after the discharge and a reciprocating plunger acting longitudinally with the pocket plungers to engage therebetween the article to be wrapped and a wrapper, and to move the same into the pocket, the adjustment of the pocket plunger being effected by pressure from the other and determined by the thickness of the article to be wrapped.

38. In a machine of the class described, the combination with a rotative wrapping wheel having pockets in its periphery, of a plunger radially disposed in the wheel at each pocket, the head thereof affording the bottom of the pocket, a sleeve surrounding the stem of the plunger and slidable in the wheel, a spring engaging the plunger stem in said sleeve and holding the plunger normally retracted to the sleeve but permitting relative movement outwardly thereof, a brake resisting sliding movement of the sleeve, means pressing said sleeve and plunger outwardly in discharging the contents of the pocket, thereby adjusting the plunger head normally at the periphery of the wheel and a guide secured in close relation to the wheel and adapted to press the plunger inwardly should it project beyond the pocket.

39. In a machine of the class described, the combination with a rotative wrapping wheel having pockets in its periphery, of a plunger radially disposed in the wheel at each pocket, the head thereof affording the bottom of the pocket, a sleeve surrounding the stem of the plunger, and slidable in the wheel, a spring engaging the plunger stem in said sleeve, and holding the plunger normally retracted to the sleeve but permitting relative movement outwardly thereof, a brake resisting sliding movement of the sleeve in said wheel, means pressing said plunger outwardly in discharging the contents of the pocket, and adjusting the plunger head normally at the periphery of the wheel, a guide secured in close relation with the wheel and adapted to press the plunger inwardly to the periphery should it project beyond the pocket and means adapted to press the article to be wrapped into the pocket the pressure thereof adjusting said plunger and sleeve to the proper depth in the pocket.

40. In a machine of the class described, the combination with a rotative wrapping wheel having pockets in its periphery, of a plunger radially disposed in the wheel at each pocket, the head thereof affording the bottom of the pocket, a sleeve surrounding the stem of the plunger slidable in the wheel, a spring engaging the plunger stem in said sleeve and holding the plunger normally retracted to the sleeve but permitting relative movement outwardly thereof, a spring brake resisting sliding movement of the sleeve in the wrapping wheel, means pressing said sleeve and plunger outwardly when discharging the contents of the pocket, and adjusting the plunger head normally to the periphery of the wheel, a guide secured in close relation with the wheel and adapted to press the plunger inwardly to the periphery of the pocket, rotative means delivering the articles to be wrapped in filling position, and a plunger adapted to press the same into said pocket such pressure adjusting the pocket plunger to afford suitable depth for the pocket.

41. In a machine of the class described, the combination of a wrapping wheel having pockets in its periphery, of mechanisms acting conjointly to deliver the articles to be wrapped and a wrapper into the pockets thereof and a folding mechanism embracing a roller, and a torsion spring engaging the same and adapted to be wound up during the folding operation, and said spring adapted to reverse the rotation of the roller to draw the fold tight.

42. In a machine of the class described, the combination of a wrapping wheel having pockets in its periphery adapted to contain the material to be wrapped together with a wrapper about three sides thereof and having the edges projecting radially outward, a folding roller, a torsion spring engaged thereon, means actuating said roller in folding the wrapper thereby winding up the spring, said spring acting to impel the roller reversely on the fold after said fold is completed thereby drawing the wrapper tight.

43. In a machine of the class described, the combination of a rotative wrapping wheel having pockets in its periphery adapted to carry the material to be wrapped together with a wrapper about three sides thereof with the edges projecting radially outwardly, a rocker shoe, a roller thereon positioned to roll rearwardly on the periphery of the wheel to fold one of said projecting edges inwardly, means actuating said rocker shoe and a torsion spring adapted to reverse the rotation of the roller on the periphery of the wheel to draw the fold tight.

44. In a machine of the class described, the combination with a rotative wrapping wheel with pockets therein adapted to contain the material to be wrapped and a wrapper partly about the same with its edges projecting radially outward, of a standard extending above the wheel, a rocker shoe pivotally and frictionally supported on said standard, a spring controlled roller at the rear extremity thereof adapted to engage on the periphery of the wheel, means actuating said shoe to throw the roller downwardly into engagement with the wheel, and to move the same rearwardly to fold one of the projecting edges of the wrapper inwardly, a torsion spring engaging said roller and acting to draw the paper rearwardly, preparatory to receiving the second top fold thereover.

45. In a machine of the class described, the combination with a rotative wrapping wheel having pockets therein adapted to contain the material to be wrapped with a wrapper inclosing three sides thereof, with its edges projecting radially outward of a standard extending above the wheel, a rocker shoe pivotally and frictionally supported on said standard, a roller at the rear extremity thereof, means actuating said shoe downwardly to bring its roller into engagement with the wheel and to move the same rearwardly to fold one of the projecting edges of the wrapper inwardly and a torsion spring engaging said roller and shoe and acting to draw the paper rearwardly, preparatory to receiving the second top fold.

46. In a machine of the class described, the combination with a rotative wrapping wheel having pockets therein adapted to contain the material to be wrapped together with a wrapper inclosing three sides thereof and with its edges projecting radially outward, of a standard extending above the wheel, a rocker shoe pivotally and frictionally supported on said standard, a roller at the rear extremity thereof, a torsion spring therefor and means actuating said shoe downwardly and rearwardly in engagement with the wheel to fold one of the projecting edges of the wrapper inwardly and rotating the roller against the torsion of the spring, said spring then driving the roller to draw the paper rearwardly preparatory to receiving the second top fold.

47. In a machine of the class described, the combination with a rotative wrapping wheel having pockets in its periphery adapted to receive the article to be wrapped together with a wrapper infolding the bottom and two sides thereof and projecting radially beyond the pocket, of a standard projecting above the wheel, a resilient shoe yieldingly supported thereon, and adapted yieldingly to press upon the periphery of the wheel, a rocker shoe pivotally and frictionally supported upon the standard in advance of said resilient shoe and means for actuating the same rearwardly to fold one of said edges inwardly and to hold the same until the second of said edges is pressed forwardly thereover by being carried beneath said resilient shoe.

48. In a machine of the class described, the combination with a rotative wrapping wheel having pockets in its periphery adapted to receive the article to be wrapped together with a wrapper infolding the bottom and two sides thereof and projecting radially beyond the pocket, of a standard projecting above the wheel, a resilient shoe yieldingly supported thereon, and yieldingly pressing upon the periphery of the wheel to near the discharge position, a rocker shoe pivotally and frictionally supported upon the standard in advance of the resilient shoe, means for actuating the rocker shoe rearwardly on the periphery of the wheel and article to be wrapped to fold one of said edges inwardly and to hold the same until the second of said edges is pressed forwardly thereover by being carried beneath the resilient shoe and a spring adapted to yield to relieve the rocker shoe from abnormal pressure.

49. In a machine of the class described, a rotative wrapping wheel having pockets in its periphery adapted to receive the article to be wrapped together with a wrapper infolding the bottom and sides thereof and projecting radially beyond the pocket, a resilient shoe yieldingly supported to yieldingly press upon the periphery of the wheel to near its discharge position, a pivotally and frictionally supported rocker shoe, a roller at the rear end thereof for engagement on the periphery of the wheel and means for actuating said rocker shoe to move the same rearwardly with its roller bearing on the periphery of said wheel and article to be wrapped to fold one of said edges inwardly and to hold the same under tension until the second of said edges is carried beneath the resilient shoe and pressed over the first formed fold.

50. In a machine of the class described, the combination with a rotative wrapping wheel having pockets in its periphery, of means delivering a piece of the material to be wrapped with a wrapper about three sides thereof into said pockets successively, a substantially stationary resilient shoe yieldingly supported to press upon the periphery of the wrapping wheel, a rocker shoe frictionally and pivotally supported to engage with the periphery in advance of said resilient shoe, a roller at the rear end of the rocker shoe, a torsion spring engaged thereto to resist the rotation of the roller when moved rearwardly over the wrapping wheel and article to be wrapped, means moving said rocker shoe downwardly and rearwardly with pressure to fold the first top fold of the wrapper rearwardly thereby winding up the spring, said spring exerting tension on said fold until the second fold is formed over the first by engagement beneath the resilient shoe and a spring adapted to permit the resilient shoe to yield upwardly.

51. In a machine of the class described, the combination with a rotative wrapping wheel having pockets in its periphery of means delivering the material to be wrapped with the wrapper infolding three sides thereof into said pockets successively, a resilient shoe yieldingly supported to yieldingly press upon the periphery of the wrapping wheel, a spring extension thereon fitted to the periphery of the wheel, a rocker shoe frictionally and pivotally supported to engage the periphery of said wheel in advance of said resilient shoe, a roller on said rocker shoe, a torsion spring engaging the same and resisting rotation of the roller when moved rearwardly on the wrapping wheel, means adapted to actuate said rocker shoe to bring the roller downwardly and rearwardly with pressure to form the first top fold of the wrapper and frictionally rotating the roller against the torsion of the spring whereby said torsion spring acts to stretch and to hold said first top fold rearwardly until the second top fold engages thereover when carried beneath said resilient shoe, a spring engaged to permit said resilient shoe to yield upwardly and a spring adjusted to permit the rocker shoe to yield to abnormal pressure.

52. In a machine of the class described, the combination with a rotative wrapping wheel having pockets in its periphery, of means delivering the material to be wrapped with a wrapper infolding three sides thereof into said pockets successively, a resilient shoe yieldingly supported to press upon the periphery of the wrapping wheel, a spring extension thereon fitted to the periphery of the wheel and directed rearwardly, a rocker shoe frictionally and pivotally supported to engage with the periphery in advance of said resilient shoe, a roller at the rear end of the rocker shoe, a torsion spring tending to resist the rotation of the roller by engagement with the wrapping wheel and said article when moved rearwardly thereover, means for actuating said rocker shoe acting to bring the same downwardly and rearwardly with pressure to fold the first top fold of the paper rearwardly, thereby winding up the spring, said spring acting to rotate the roller reversely to stretch and hold the fold rearwardly until the pocket passes beneath said resilient shoe thereby pressing the second top fold over the first fold and mechanism connected with each of said shoes permitting the same to yield from the wheel under abnormal pressure.

53. In a machine of the class described, the combination with a wrapping wheel of a rocker shoe adapted to form the first top fold, a roller journaled at the rear end of the rocker shoe and a torsional spring engaging said roller and shoe and adapted to be wound up as the roller is moved rearwardly in making the fold, and to reverse the rotation of the roller on the fold to stretch the wrapper by said rotation just before the formation of the second top fold.

54. In a wrapping machine a wrapping wheel, a folding roller and a torsion spring adapted to reverse the rotation of the roller on the wrapping wheel.

55. In a wrapping machine the combination with a folding roller, of means for moving the same to make the first top fold, a spring adapted to maintain tension on the fold as the article to be wrapped moves from beneath the same, and means for retracting the roller.

56. In a wrapping machine a folding roller, means for actuating the folding roller over the article to be wrapped, a torsion spring acting in conjunction therewith and adapted to maintain tension on the fold while the article to be wrapped is advanced from beneath the roller, and means for advancing the article from beneath the roller.

57. In a machine of the class described, the combination with a wrapping wheel having pockets to carry the article to be wrapped and a wrapper of a rocker shoe adapted to form the first top fold, a roller journaled at the rear end of the rocker shoe, a torsional spring engaging said roller and shoe and adapted to be wound up as the roller is moved rearwardly in making the fold and to reverse the rotation of the roller on the fold to exert tension on the fold until the formation of the second fold thereover, means for making said second fold and a spring disposed to yield to relieve said rocker shoe from undue or excessive pressure.

58. In a machine of the class described, the combination with a wrapping wheel having pockets adjustable as to depth therein to carry the article to be wrapped and the wrapper of a rocker shoe adapted to form the first top fold, a roller journaled at the rear end of the rocker shoe and a torsion spring engaging said roller and shoe, and adapted to be wound up as the roller is moved rearwardly in making the fold, and to reverse the rotation of the roller on the fold to stretch the paper by reverse rotation of the roller during the formation of the second top fold thereover and yielding mechanism for making the second top fold.

59. In a machine of the class described, the combination with mechanism for carrying the articles to be wrapped and the wrapper infolding three sides thereof, of a torsional roller adapted to form the first top fold, means for actuating the same, a resilient shoe beneath which the articles are carried after the formation of the first fold to form the second top fold, said torsional roller acting to stretch the wrapper to receive the second fold, means for making the end folds and a yielding extension on said resilient shoe to hold the folds during the forming of the end folds.

60. In a machine of the class described, the combination with the carrying element for the material to be wrapped and their wrappers of a rocker shoe adapted to form the first top fold of the wrapper, means for actuating the same, a resilient shoe beneath which the package to be wrapped is carried in forming the second top fold and a resilient extension fitting the carrying element and adapted to hold the wrapper in place.

61. In a machine of the class described, the combination with an element for carrying the material to be wrapped and a wrapper partly infolding the same of means adapted to form the first top fold in the wrapper, a resilient shoe beneath which the package to be wrapped is carried in forming the second top fold over the first and a pivotally supported leaf spring adapted at each end to lift independent of the opposite end and fitted to the carrying element and acting to retain the top folds until the end folds are made and rotating end folding members adapted to yield in planes parallel to and transversely of the carrying element.

62. In a machine of the class described, the combination with a rotative wrapping wheel having pockets of regulable depth therein, of mechanism for delivering the article to be wrapped, together with a wrapper partly investing the same into said pockets successively and with the edges of the wrapper projecting radially therefrom, of mechanism forming the first top fold, a pivotally supported frictional resilient shoe having a smooth under surface and bearing on the periphery of the wrapping wheel and adapted to form the second top fold by engagement of the wrapping material thereagainst and thereunder, said shoe being of a length to engage and yieldingly press said top folds until one or more end folds are completed, means for making the end folds, and torsion means for yieldingly holding the shoe against the wrapping wheel.

63. In a machine of the class described, the combination with a rotative wrapping wheel having pockets therein of mechanism for delivering the article to be wrapped, together with a wrapper partly investing the same into said pockets, and with the edges of the wrapper projecting radially therefrom, torsionally operating mechanism adjustable to exert a predetermined pressure in forming the first fold, means releasing said mechanism when abnormal resistance is encountered, a frictional, resilient shoe bearing on the periphery of the wrapping wheel and adapted to form the second top fold by engagement of the wrapper thereagainst and thereunder, and an extension on said shoe of a length to engage and yieldingly press said top folds.

64. In a machine of the class described, the combination with a rotative wrapping wheel having peripheral pockets of mechanism for delivering the articles to be wrapped together with a sheet of the wrapping material partly investing the same into each pocket successively, and with the edges projecting radially therefrom, movable mechanism adjustable to yield to excess pressure and at normal pressure forming the first top fold, a frictional, resilient, substantially stationary shoe bearing on the periphery of the wrapping wheel to form the second top fold by engagement of the rear free edge of the wrapping material thereagainst and thereunder, a torsion spring concealed within the shoe and exerting pressure to draw the shoe inwardly, and a curved spring extension secured on the shoe and of a length to engage and yieldingly press said top folds in place.

65. In a mechanism of the class described, the combination of a rotative wrapping wheel having pockets therein and mechanism for delivering the articles to be wrapped successively into said pockets, each with its wrapper investing the bottom and two sides thereof, and with the edges directed radially from the wheel, means forming the first top fold by pressing the same rearwardly and downwardly, substantially stationary, resilient folding means having a substantially smooth under surface engaging the periphery of the wrapping wheel and beneath which the article to be wrapped is carried thereby forming the second top fold over the first, a leaf spring fitted to the periphery of the wheel to retain the second fold in folded position, a yielding tension member adapted to press the second folding mechanism against the periphery of the wrapping wheel and yielding means adapted to draw the second folding mechanism peripherally of the wheel.

66. In a mechanism of the class described, the combination of a wrapping wheel having pockets therein and mechanism for delivering the articles to be wrapped successively into said pockets together with a wrapper, said wrapper investing the bottom and two sides of said article with the edges directed radially from the wheel, means adapted to form the first top fold by pressing the front projecting edge rearwardly and downwardly, substantially stationary, resilient folding means engaging the periphery of the wrapping wheel and beneath which the article to be wrapped is carried after the completion of the first top fold thereby forming the second top fold, an extension pivotally supported and acting to yieldingly engage said folds in place and an adjustable spring tension device acting to press said resilient folding means on the wheel but permitting the passage of an abnormally projecting package thereunder.

67. In a machine of the class described a rotative wrapping wheel having pockets in its periphery, mechanism for delivering articles to be wrapped into the pockets with a wrapper, means rotatable on the periphery of the wheel in one direction to press the first top fold down on the article, means for reversely rotating said rotatable means on the first top fold to draw the fold tight, yielding mechanism for folding the second top fold over the first top fold after said first top fold has been drawn tight and means for pressing said yielding mechanism to draw the second top fold tight.

68. In a machine of the class described, the combination of a wrapping wheel having pockets opening through its periphery, and mechanism for delivering the pieces to be wrapped each with a wrapper, its margins projecting from the pocket on the front and rear thereof, means forming the first top fold, substantially stationary mechanism normally engaging the periphery of the wrapping wheel and forming the second top fold over the first as the pocket passes thereunder, a spring extension connected with said second fold mechanism and acting to retain said folds, until the completion of one or more end folds, a torsion spring connected with the second top fold mechanism and spring extension, tucker blades adapted to engage on the projecting ends of the folded wrapper to force the same inwardly, means actuating the tucker blades and a spring operatively connected with the tucker blades and permitting the same to yield upwardly against abnormal resistance to form the tuck.

69. In a machine of the class described, the combination of a wrapping wheel having pockets opening through its periphery and mechanism for delivering the articles to be wrapped and a wrapper thereinto with the margins of said wrapper projecting radially from the front and rear sides of the pocket, means forming the first top fold, a torsion device for actuating the same to draw the top fold tight, mechanism substantially stationary adapted to normally engage the periphery of the wrapping wheel and forming the second top fold over the first as the pocket passes thereunder, a torsion device for actuating the same to draw the second top fold tight over the first top fold, a resilient extension thereon retaining said folds, until the completion of one or more end folds, pivotally supported tucker blades adapted to engage the projecting ends of the folded wrapper, to force the same inwardly, means actuating the tucker blades, a spring operatively connected with the tucker blades and adapted to yield against abnormal resistance to form the tucks and a continuously rotating member adapted to form the first end fold as the tucker blades are retracting.

70. In a machine of the class described, the combination of an intermittently rotating wrapping wheel having pockets opening through its periphery and rotative means delivering the pieces to be wrapped thereto, of mechanism for pressing the pieces to be wrapped and a wrapper into successive pockets with the front and rear margins of said wrapper projecting radially from the pocket, means forming the first top fold, actuating mechanism for said means provided with an automatic release device, substantially stationary mechanism normally engaging the periphery of the wrapping wheel yieldingly, and forming the second top fold over the first, as the pocket passes thereunder and acting to hold the folds until the completion of one or more end folds, a torsion spring connected with said mechanism, tucker blades adapted to engage on each projecting end of the folded wrapper to force the same inwardly, a loosely pivoted arm on which said blades are engaged, means actuating the same and a spring operatively connected with said tucker blades at the pivot and permitting the blades to yield against abnormal resistance to form the tuck.

71. In a machine of the class described, mechanism adapted to form the end tuck in the partly wrapped package embracing a stationary support, an arm loosely hinged thereto, a spring engaged at said hinge to permit said arm to yield upwardly, a lever engaged to the arm, a cam operated lever positively connected therewith, tucker blades secured on the opposite sides of the arm and projecting downwardly and adapted to engage the top folds and press the same downwardly at each end thereof, resilient means acting to hold the top folds until the completion of the tucks and a continuously rotating arm acting to form the first end fold as the tucker blades are retracting.

72. In a machine of the class described, mechanism adapted to form the end tucks in the partly wrapped package embracing a stationary support, an arm loosely hinged thereto, a spring engaged at said hinge and acting normally to hold the arm down but adapted to yield to abnormal resistance, tucker blades on said arm adapted to press the top folds inwardly at their ends, a lever engaged with the arm, a cam operated lever positively connected therewith, a cam actuating the same and affording accelerating initial motion in tucking and retarded motion in retracting from the tucks, a shoe positively holding said top folds until the completion of said end tucks, a continually and rearwardly rotating arm acting at each end of the package to form the first end folds over the tucks as the tuckers are retracting and journaled to yield to an abnormally projecting package.

73. In a machine of the class described, the combination of a wrapping wheel having pockets in its periphery, and means for rotating said wheel, mechanism delivering articles to be wrapped together with the wrapper into said pockets, mechanisms forming the first and second top folds and tucking the ends of the folds inwardly from the top, continuously rotating arms, one at each side the wrapping wheel and positioned to engage the projecting ends of the wrapper to form the first end fold upon the tucks, said arms beginning the folding operation as the tucking blades are retracting and means adapting said arms to yield for abnormally projecting packages in the pockets.

74. In a machine of the class described, the combination with a wrapping wheel having pockets in its periphery of means for rotating said wheel, mechanisms delivering articles to be wrapped together with the wrapper into successive pockets, mechanisms forming the first and second top folds and tucking the ends of the top folds inwardly, rearwardly rotating shafts journaled on each side the wheel, an arm yieldingly secured on each shaft and adapted to fold the ends of the wrapper rearwardly to form the first end folds as the tucking mechanism is retracting and movable longitudinally and peripherally the axis of rotation when engaged on an abnormally projecting package.

75. In a machine of the class described, the combination of a wrapping wheel having pockets in its periphery and means for rotating said wheel, mechanisms delivering articles to be wrapped together with the wrapper into successive pockets, mechanisms forming the first and second top folds and tucking the ends of the folds inwardly, continuously rotating arms, one at each side the wrapping wheel and, positioned to engage the projecting ends of the wrapper to form the first end folds and beginning the folding operation as the tucking mechanism is retracted and means permitting independent retardation of said arms, and said arms movable outwardly from the wheel when encountering abnormal resistance.

76. In a wrapping machine the combination of a wrapping wheel and mechanisms to deliver the article to be wrapped partly inclosed in its wrapper into successive pockets, mechanisms acting to form the first and second top folds in the projecting margins of the wrapper, tucking blades operating on each side the wheel to press said top fold downwardly to afford an end tuck, horizontal shafts one on each side the wrapping wheel and rotating rearwardly, an arm on each shaft positioned to engage the projecting end of the wrapper to fold the same rearwardly, and means permitting said arm to yield outwardly and against the rotation thereof upon encountering abnormal resistance to the formation of the end fold.

77. In a wrapping machine the combination with a wrapping wheel having pockets therein, of mechanisms for delivering into successive pockets the articles to be wrapped, each with a wrapper about the bottom and two sides thereof, and having the margins projecting radially from the pocket, mechanisms acting to form the first and second top folds, tucking blades operating to press said top folds downwardly to afford end tucks, shafts arranged in alinement one on each side the wrapping wheel and rotating rearwardly thereof, an arm secured on each shaft and positioned to engage the projecting end of the wrapper to fold the same rearwardly over the tucks, and a spring normally holding said arm in operative position but adapted to yield should the arm encounter abnormal resistance in forming the end fold, thereby permitting outward movement of the arm from the wheel.

78. In a wrapping machine the combination of a wrapping wheel having pockets therein and mechanisms to deliver the articles to be wrapped each with a wrapper about the bottom and two sides thereof into successive pockets with the margins projecting from the pockets, mechanisms acting to form the first and second top folds, tucking blades operating to press said top folds downwardly at each end, to afford the end tucks, horizontal shafts arranged in alinement one on each side the wrapping wheel and rotating rearwardly thereof, an arm secured on each shaft and adapted to yield longitudinally and against rotation and normally positioned to engage the projecting ends of the wrapper to fold the same rearwardly over the tucks and springs normally holding the arms in operative position, said tucker blades and said arms being timed for the latter to act as the former are retracting.

79. In a wrapping machine a rotary wrapping wheel, and a finger or arm, for making an end fold, rotating within the periphery of said wheel and the end of the arm rotating inwardly toward the axis of the wheel as it completes the fold thereby continuously drawing the end fold down and tight.

80. In a wrapping machine a rotary wrapping wheel, an arm rotating adjacent thereto and acting to form a side fold and means adapted to permit said rotating arm to yield reversely to the direction of rotation of the wheel and transversely of the wheel.

81. In a wrapping machine a rotary wrapping wheel, a finger or arm rotating at the side of the wheel and acting to form an end fold and a spring holding said arm in operative position but permitting said arm to yield reversely to the direction of rotation of the wrapping wheel when the arm encounters abnormal resistance in forming the fold.

82. In a wrapping machine the combination of a wrapping wheel having pockets therein of mechanisms acting to deliver the articles to be wrapped with a wrapper about the bottom and two sides thereof into successive pockets, and projecting radially from the pockets, mechanisms acting to form the first and second top folds, tucking blades acting to press said top folds downwardly at each end to afford the end tucks, continuously rotating arms positioned to engage the projecting ends of the wrapper to fold the same over the end tucks and adapted to yield to abnormal pressure, and a shoe yieldingly pressed against each side of the wrapping wheel and adapted to form the second end folds by the passage of the pocket and its contents therebetween.

83. In a wrapping machine the combination of a wrapping wheel having pockets therein of mechanisms acting to deliver the articles to be wrapped with a wrapper about the bottom and two sides thereof into successive pockets and projecting radially from the pockets, mechanisms acting to form the first and second top folds, tucking blades acting to press said top folds downwardly at each end to afford the end tucks, continuously rotating arms positioned to engage the projecting ends of the wrapper to fold the same over the end tucks and adapted to yield to abnormal pressure, a shoe yieldingly pressed against each side of the wrapping wheel and adapted to form the second end folds by the passage of the pocket and its contents therebetween, and of a length to retain said end folds until the discharge of the wrapped package from the wheel.

84. In a wrapping machine the combination of a wrapping wheel having pockets therein, mechanisms to deliver the articles to be wrapped each with a wrapper about the bottom and two sides thereof into said pockets with the margins projecting radially therefrom, mechanisms acting to form the first and second top folds, tucking blades acting to press said top folds inwardly at each end to afford the end tucks, a continuously rotating arm positioned to engage the projecting end of the wrapper on each side the wheel to fold the same rearwardly, means normally holding the same in operative position but permitting the same to yield to abnormal resistance in forming the end fold, and hinged spring pressed shoes yieldingly engaged against opposite sides of the wrapping wheel and acting to form the second end fold by the passage of the pocket and its contents therebetween and to retain said folds until discharge from the wheel.

85. In a wrapping machine the combination of a wrapping wheel having pockets in its periphery, mechanisms acting to deliver the articles to be wrapped each with a wrapper about the bottom and two sides thereof, and with margins projecting radially from the pockets, mechanisms acting to form the first and second top folds, tucking blades operating to press said top folds inwardly at each end to afford the end tucks, continuously rotating shafts on each side the wrapping wheel, an arm uniformly driven by each shaft to fold the projecting ends of the wrapper rearwardly over the tucks, a spring for each arm permitting said arm to yield upon encountering abnormal resistance in the formation of the end fold, a shoe hinged on each side the wheel and fitted to the sides thereof, a spring pressing the same yieldingly against the sides of the wrapping wheel, to form the second end fold by the passage of the pocket and its contents therebetween and acting to retain said folds until the discharge from the wheel and automatic means acting to discharge the package from successive pockets.

86. In a wrapping machine the combination of a wrapping wheel having pockets therein, mechanisms to deliver the articles to be wrapped with a wrapper about the bottom and two sides thereof and projecting radially from the wheel, into each pocket, mechanisms acting to form the first and the second top folds, tucking blades acting on the top folds at each end to afford the end tucks, continuously rotating spring pressed arms on each side the wheel acting normally to fold projecting ends of the wrapper and automatically yielding on encountering abnormal resistance, a shoe yieldingly pressed against each side the wrapping wheel and adapted to form the second end fold by the passage of the pocket and its contents therebetween and to retain said folds, simultaneously and oppositely swinging arms adapted to receive the discharge package therebetween, an inwardly projecting blade on each acting to form the last end fold by closing the same forwardly on the bottom of the package and springs engaging said blades to said arms in operative position but permitting the same to yield to release abnormal packages.

87. In a machine of the class described, parallel forwardly directed arms, operative connections to swing the same simultaneously and oppositely to receive the discharged package therebetween, inwardly projecting coacting blades pivoted at the end of each arm to form the last end fold of the package by closing the same forwardly, and springs engaging said blades to said arms to permit the same to swing downwardly for the discharge of imperfectly wrapped packages.

88. In a device of the class described the combination with a wheel for carrying the articles to be wrapped, means for folding one of the free ends of the wrapper over the article, means adapting the folding means to yield laterally of the carrying wheel and means adapting the folding means to yield relatively of the carrying wheel.

89. In a device of the class described a rotative carrying wheel having pockets therein and mechanism for making the first top fold adapted to yield both peripherally and laterally of the wheel when abnormal resistance is encountered.

90. In a device of the class described mechanism for making a top fold embracing an oscillating shoe, a roller carried thereby, operating mechanism for actuating the shoe to rotate the roller over the wrapper in making the fold, and springs interposed in the operating mechanism, one to permit the shoe to yield outwardly when encountering abnormal resistance and the other adapting the shoe to move laterally.

91. In a device of the class described a carrying wheel having pockets for receiving articles to be wrapped with the wrapper ends extending radially outwardly, a pivoted lever, a cam for actuating the same, a lever pivoted thereto extending parallel therewith, a rod rigidly engaged to one lever extending through an aperture in the other and concentric with the pivot for the levers, a spring on said rod normally holding said levers parallel and mechanism for folding one of the wrapper ends actuated by the levers and adapted when abnormal resistance is exerted to yield by compressing said spring.

92. In a device of the class described mechanism for folding an outwardly projecting end of a wrapper, levers pivotally connected, one being normally in alinement with the other and forming a continuation thereof, a spring normally holding said levers in alined position and adapting said levers to separate when the folding mechanism encounters abnormal resistance and means connecting the levers with the folding mechanism.

93. In a device of the class described mechanism for folding an outwardly projecting end of a wrapper, independent means adapting said folding mechanism to yield in opposite directions at a predetermined pressure and means for independently adjusting the same to vary the pressure at which the folding mechanism may yield.

94. In a device of the class described mechanism for making a top fold, embracing pivotally connected members, means for oscillating the same, a spring for holding the members in normal relation adapting one member to yield from the other, means for varying the pressure at which the member yields, a pivotally supported folding shoe and means connecting the same with the yielding member.

95. In a device of the class described a rotatable shaft, end tucking blades journaled thereon, a spring connecting the tucking blades to normally rotate with the shaft and adapting the tucking blades to yield, means for actuating the shaft and rotatable end folding mechanism yieldable in its direction of rotation and yieldable laterally.

96. In a device of the class described a rotatable shaft, an arm loosely mounted thereon, end tucking blades removably secured in said arm, means normally actuating said arm as the shaft rotates adapting the arm to yield when encountering abnormal resistance, mechanism adapted to make an end fold as the tucker blades complete the end tuck and means adapting said end folding mechanism to yield in a plurality of directions.

97. In a device of the class described end tucking mechanism, actuating mechanism therefor, means affording connection between the tucking and actuating mechanism adapted under excess stress to permit the tucking mechanism becoming non-movable and rotatable, oppositely yielding devices for making the first end folds, means for rotating the devices and means adapting the end folding devices to momentarily cease rotating.

98. In a device of the class described a wrapping wheel, a rotating folding member rotating between the axis of rotation of the wheel and periphery thereof and rotating closely to the rim, means adapting said member to yield longitudinally of the axis of the wheel and means adapting the member to yield reversely to its direction of rotation.

99. In a device of the class described a shaft, a folding member secured on one end thereof, a tubular shaft journaled on said shaft to rotate relatively thereof and to move longitudinally thereof and a spring connecting the shafts to rotate together when the resistance encountered does not exceed that for which the spring is set.

100. In a device of the class described an end folding mechanism embracing concentric shafts normally rotatable together and adapted to rotate relatively of each other and move longitudinally of each other, means connecting the shafts adapted to permit said relative rotation and longitudinal movement, a gear secured on one of the shafts and a folding finger on the other shaft.

101. In a device of the class described concentric shafts movable longitudinally of each other, a spring connecting the shafts, an end folding member on the end of one shaft and means for rotating said shafts.

102. In a device of the class described concentric shafts normally rotatable together and adapted to rotate relatively of each other, means yieldingly connecting the shafts, and a folding mechanism on one of the shafts.

103. In a device of the class described mechanism for making the last end folds comprising arms connected to operate together, means permitting the arms to yield and end folding blades yieldingly and rotatably secured to said arms.

104. In a device of the class described simultaneously and oppositely movable arms, a single spring connected to permit both to yield, a folding blade carried by each arm and a spring for each folding blade adapting the same to yield under normal conditions.

105. In a wrapping machine a rotatable wrapping wheel, means for delivering the material to be wrapped thereto, means for making the last folds comprising simultaneously movable arms, a shaft secured to each adapted to move longitudinally of said arm and to rotate relatively of said arm and a rigid blade secured to each shaft.

106. In a wrapping machine pivotally supported end folding shoes and a spring for each adapting the same to yield oppositely and normally holding the shoes to tightly wrap the last end folds and plates for making the final folds adapted to yield independently when encountering abnormal resistance.

107. In a wrapping machine an expansible chute for receiving the wrapped articles and a hinged bottom section for permitting discharge of an abnormally shaped article.

108. In a device of the class described a chute embracing a rigid bottom, a hinged section secured thereto, means yieldingly holding the same in place and resilient side and top members.

109. In a device of the class described the combination with pivoted arms, actuating mechanism yieldingly connecting the same, folding members secured to the arms and rotatable relatively thereof and movable longitudinally thereof.

110. In a device of the class described a rotatable wrapping wheel provided with pockets, a plunger for each pocket, a retraction spring for each plunger and a friction spring adapted to normally hold the plunger at the periphery of the wheel.

111. In a device of the class described a wrapping wheel having pockets therein, a plunger therein, a spring acting at all times to retract the plunger, a friction sleeve and a spring exerting a greater pressure thereagainst than the retraction pressure of the plunger spring.

112. In a device of the class described a wrapping wheel provided with pockets, a plunger in the pocket, an inwardly directed stem secured thereto, a sleeve through which the stem extends, a spring acting to hold the plunger head against the top of the sleeve, a member frictionally engaging the sleeve and regulable means for varying the frictional engagement between the sleeve and said member.

113. In a device of the class described a wrapping wheel having radial pockets therein, a sleeve and plunger for each pocket adapted to move together, means permitting a limited movement of the plunger independently of the movement of the sleeve and means resisting movement of the sleeve.

114. In a device of the class described a rotative wrapping wheel having pockets therein, a plunger for each pocket and a stationary guide for automatically forcing any projecting plunger to lie flush with the periphery of the wheel.

115. In a device of the class described a wrapping wheel having pockets therein, plungers forming the bottoms for said pockets and means adjacent the periphery of the wheel for retracting any plunger projecting beyond the periphery of the wheel.

116. In a wrapping machine a wrapping wheel provided with pockets, a plunger in said pocket, a feed plunger pivoted to swing horizontally, a stationary cutting blade, a horizontally oscillating blade for coacting therewith in severing paper for the wrapper and means for automatically retracting any projecting plunger to lie flush with the mouth of the pocket to receive the cut wrapper against the periphery of the wheel and the plunger.

117. In a device of the class described a wrapping wheel provided with pockets, concentric movable members therein, a head rigidly secured on one of the members and a spring normally exerting tension to hold the head against the other member.

118. In a device of the class described a wrapping wheel provided with pockets, concentric members therein, a head rigidly secured on one of the members, a spring normally exerting tension to hold the head against the other member, a friction member bearing against the outer of said concentric members and means exerting greater frictional pressure thereagainst than the tension of said spring.

119. In a wrapping mechanism a wrapping wheel provided with pockets, a sleeve slidable therein, a plunger movably engaged in the sleeve adapted to move a predetermined distance independently of the sleeve, means preventing movement of the sleeve except when positively actuated and means for returning the plunger to normal after each independent movement of the sleeve.

In testimony whereof we have hereunto subscribed our names in the presence of two subscribing witnesses.

ARCHIBALD E. HOPKINS.
OLIN S. FELLOWS.

Witnesses:
HENRY W. WIGGINS,
RUSSELL WIGGINS.